(12) United States Patent
Laroia et al.

(10) Patent No.: US 9,603,102 B2
(45) Date of Patent: *Mar. 21, 2017

(54) METHOD OF TRANSMITTING PILOT TONES IN A MULTI-SECTOR CELL, INCLUDING NULL PILOT TONES, FOR GENERATING CHANNEL QUALITY INDICATORS

(75) Inventors: Rajiv Laroia, Far Hills, NJ (US); John L. Fan, Livingston, NJ (US); Junyi Li, Bedminster, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 352 days.

This patent is subject to a terminal disclaimer.

(21) Appl. No.: 11/748,433

(22) Filed: May 14, 2007

(65) Prior Publication Data
US 2007/0213087 A1    Sep. 13, 2007

Related U.S. Application Data

(63) Continuation of application No. 10/648,766, filed on Aug. 25, 2003, now Pat. No. 7,218,948.
(Continued)

(51) Int. Cl.
*H04B 17/02* (2006.01)
*H04W 52/24* (2009.01)
(Continued)

(52) U.S. Cl.
CPC .......... *H04W 52/24* (2013.01); *H04B 7/0491* (2013.01); *H04L 5/0048* (2013.01);
(Continued)

(58) Field of Classification Search
CPC .... H04W 52/243; H04W 16/24; H04W 48/12
(Continued)

(56) References Cited

U.S. PATENT DOCUMENTS

| 4,631,720 A | 12/1986 | Koeck |
| 4,660,196 A | 4/1987 | Gray et al. |

(Continued)

FOREIGN PATENT DOCUMENTS

| CN | 1159262 A | 9/1997 |
| CN | 1159286 A | 9/1997 |

(Continued)

OTHER PUBLICATIONS

International Search Report—PCT/USO4/0005241, International Search Authority—U.S. Patent Office—Oct. 15, 2004.
(Continued)

*Primary Examiner* — Tu X Nguyen

(57) ABSTRACT

Pilot signal transmission sequences and methods for use in a multi-sector cell. Pilots in different sectors are transmitted at different known power levels. In adjacent sectors a pilot is transmitted while no pilot is transmitted in the adjoining sector. This represents transmission of a NULL pilot signal. A cell NULL is also supported in which NULL pilots are transmitted in each sector of a cell at the same time. Multiple pilot signal measurements are made. At least two channel quality indicator values are generated from measurements corresponding to at least two pilot signals of different power levels. The two values are transmitted back to the base station which uses both values to determine the transmit power required to achieve a desired SNR at the wireless terminal. The wireless terminal also reports information indicating its location to a sector boundary.

25 Claims, 13 Drawing Sheets

Related U.S. Application Data

(60) Provisional application No. 60/449,729, filed on Feb. 24, 2003.

(51) Int. Cl.
  *H04B 7/04* (2006.01)
  *H04L 25/02* (2006.01)
  *H04L 5/00* (2006.01)
  *H04W 16/24* (2009.01)
  *H04W 52/32* (2009.01)
  *H04B 17/24* (2015.01)
  *H04B 17/309* (2015.01)

(52) U.S. Cl.
  CPC .......... *H04L 25/0226* (2013.01); *H04B 17/24* (2015.01); *H04B 17/309* (2015.01); *H04L 5/0007* (2013.01); *H04W 16/24* (2013.01); *H04W 52/325* (2013.01)

(58) Field of Classification Search
  USPC ......... 370/318, 319, 335; 455/13.4, 68, 522, 455/63.1, 135
  See application file for complete search history.

(56) References Cited

U.S. PATENT DOCUMENTS

| | | |
|---|---|---|
| 4,679,244 A | 7/1987 | Kawasaki et al. |
| 4,833,701 A | 5/1989 | Comroe et al. |
| 5,128,938 A | 7/1992 | Borras |
| 5,203,013 A | 4/1993 | Breeden et al. |
| 5,387,905 A | 2/1995 | Grube et al. |
| 5,434,848 A | 7/1995 | Chimento, Jr. et al. |
| 5,461,645 A | 10/1995 | Ishii |
| 5,465,389 A | 11/1995 | Agrawal et al. |
| 5,491,837 A | 2/1996 | Haartsen |
| 5,506,865 A | 4/1996 | Weaver, Jr. |
| 5,537,414 A | 7/1996 | Takiyasu et al. |
| 5,579,307 A | 11/1996 | Richetta et al. |
| 5,732,328 A | 3/1998 | Mitra et al. |
| 5,835,847 A | 11/1998 | Gilmore et al. |
| 5,867,478 A | 2/1999 | Baum et al. |
| 5,898,925 A | 4/1999 | Honkasalo et al. |
| 5,914,950 A | 6/1999 | Tiedemann, Jr. et al. |
| 5,915,221 A | 6/1999 | Sawyer et al. |
| 5,923,650 A | 7/1999 | Chen et al. |
| 5,933,421 A | 8/1999 | Alamouti et al. |
| 5,940,771 A | 8/1999 | Gollnick et al. |
| 5,966,657 A | 10/1999 | Sporre |
| 5,966,662 A | 10/1999 | Murto |
| 5,978,657 A | 11/1999 | Suzuki |
| 5,999,534 A | 12/1999 | Kim |
| 6,002,676 A | 12/1999 | Fleming |
| 6,004,276 A | 12/1999 | Wright et al. |
| 6,026,081 A | 2/2000 | Hamabe |
| 6,028,842 A | 2/2000 | Chapman et al. |
| 6,028,843 A | 2/2000 | Delp et al. |
| 6,035,000 A | 3/2000 | Bingham |
| 6,069,871 A | 5/2000 | Sharma et al. |
| 6,070,072 A | 5/2000 | Dorenbosch et al. |
| 6,073,025 A | 6/2000 | Chheda et al. |
| 6,122,270 A | 9/2000 | Whinnett et al. |
| 6,128,506 A | 10/2000 | Knutsson et al. |
| 6,131,016 A | 10/2000 | Greenstein et al. |
| 6,141,565 A | 10/2000 | Feuerstein et al. |
| 6,169,896 B1 | 1/2001 | Sant et al. |
| 6,173,005 B1 * | 1/2001 | Kotzin et al. ................. 375/141 |
| 6,181,948 B1 | 1/2001 | Kondo |
| 6,201,793 B1 | 3/2001 | Chen et al. |
| 6,205,129 B1 | 3/2001 | Esteves et al. |
| 6,215,791 B1 | 4/2001 | Kim |
| 6,236,646 B1 | 5/2001 | Beming et al. |
| 6,256,478 B1 | 7/2001 | Allen et al. |
| 6,259,927 B1 | 7/2001 | Butovitsch et al. |
| 6,263,392 B1 | 7/2001 | McCauley et al. |
| 6,298,233 B1 | 10/2001 | Souissi et al. |
| 6,308,080 B1 | 10/2001 | Burt et al. |
| 6,310,857 B1 | 10/2001 | Duffield et al. |
| 6,311,065 B1 | 10/2001 | Ushiki et al. |
| 6,374,085 B1 | 4/2002 | Saints et al. |
| 6,377,583 B1 | 4/2002 | Lyles et al. |
| 6,377,955 B1 | 4/2002 | Hartmann et al. |
| 6,405,047 B1 | 6/2002 | Moon et al. |
| 6,414,946 B1 | 7/2002 | Satou et al. |
| 6,445,917 B1 | 9/2002 | Bark et al. |
| 6,453,151 B1 | 9/2002 | Kiang et al. |
| 6,493,539 B1 | 12/2002 | Falco et al. |
| 6,526,281 B1 | 2/2003 | Gorsuch et al. |
| 6,538,986 B2 | 3/2003 | Isaksson et al. |
| 6,545,999 B1 | 4/2003 | Sugita et al. |
| 6,549,780 B2 | 4/2003 | Schiff et al. |
| 6,553,336 B1 | 4/2003 | Johnson et al. |
| 6,590,890 B1 | 7/2003 | Stolyar et al. |
| 6,597,914 B1 | 7/2003 | Silventoinen et al. |
| 6,600,903 B1 | 7/2003 | Lilja et al. |
| 6,609,007 B1 | 8/2003 | Eibling et al. |
| 6,621,808 B1 | 9/2003 | Sadri |
| 6,625,133 B1 | 9/2003 | Balachandran et al. |
| 6,662,024 B2 | 12/2003 | Walton et al. |
| 6,671,512 B2 | 12/2003 | Laakso |
| 6,680,909 B1 | 1/2004 | Bansal et al. |
| 6,697,417 B2 | 2/2004 | Fernandez-Corbaton et al. |
| 6,710,651 B2 | 3/2004 | Forrester et al. |
| 6,728,551 B2 | 4/2004 | Chang |
| 6,742,020 B1 | 5/2004 | Dimitroff et al. |
| 6,745,003 B1 | 6/2004 | Maca et al. |
| 6,745,044 B1 | 6/2004 | Holtzman et al. |
| 6,751,187 B2 | 6/2004 | Walton et al. |
| 6,771,934 B2 | 8/2004 | Demers et al. |
| 6,788,963 B2 | 9/2004 | Laroia et al. |
| 6,798,761 B2 | 9/2004 | Cain et al. |
| 6,804,289 B2 | 10/2004 | Takahashi |
| 6,804,521 B2 * | 10/2004 | Tong et al. ................. 455/450 |
| 6,816,476 B2 | 11/2004 | Kim et al. |
| 6,836,673 B1 | 12/2004 | Trott et al. |
| 6,865,168 B1 | 3/2005 | Sekine et al. |
| 6,889,056 B2 | 5/2005 | Shibutani et al. |
| 6,889,257 B1 | 5/2005 | Patel |
| 6,892,071 B2 | 5/2005 | Park et al. |
| 6,895,005 B1 | 5/2005 | Malin et al. |
| 6,895,364 B2 | 5/2005 | Banfer |
| 6,901,268 B2 | 5/2005 | Chang |
| 6,901,270 B1 | 5/2005 | Beach |
| 6,904,016 B2 | 6/2005 | Kuo et al. |
| 6,912,405 B2 | 6/2005 | Hiramatsu et al. |
| 6,917,607 B1 | 7/2005 | Yeom et al. |
| 6,940,827 B2 | 9/2005 | Li et al. |
| 6,954,643 B2 | 10/2005 | Petrus |
| 6,957,072 B2 | 10/2005 | Kangras et al. |
| 6,967,937 B1 | 11/2005 | Gormley |
| 6,968,156 B2 | 11/2005 | Sugaya et al. |
| 7,006,841 B2 | 2/2006 | Monogioudis et al. |
| 7,024,460 B2 | 4/2006 | Koopmas et al. |
| 7,027,782 B2 | 4/2006 | Moon et al. |
| 7,031,983 B2 | 4/2006 | Israni et al. |
| 7,034,254 B2 | 4/2006 | Grabowski et al. |
| 7,039,029 B2 | 5/2006 | Lee et al. |
| 7,043,254 B2 | 5/2006 | Chawla et al. |
| 7,047,009 B2 | 5/2006 | Laroia et al. |
| 7,054,643 B2 | 5/2006 | Trossen et al. |
| 7,061,885 B2 | 6/2006 | Kurtz et al. |
| 7,092,672 B1 | 8/2006 | Pekonen et al. |
| 7,120,123 B1 | 10/2006 | Quigley et al. |
| 7,120,448 B2 | 10/2006 | Brouwer |
| 7,123,910 B2 | 10/2006 | Lucidarme et al. |
| 7,139,536 B2 | 11/2006 | Chiu et al. |
| 7,142,548 B2 | 11/2006 | Fong et al. |
| 7,146,172 B2 * | 12/2006 | Li et al. ................. 455/452.1 |
| 7,158,796 B2 | 1/2007 | Tiedemann, Jr. et al. |
| 7,161,909 B2 | 1/2007 | Sharma |
| 7,162,203 B1 | 1/2007 | Brunner |
| 7,164,883 B2 | 1/2007 | Rappaport et al. |
| 7,197,025 B2 | 3/2007 | Chuah et al. |
| 7,203,493 B2 | 4/2007 | Fujii et al. |

(56) References Cited

U.S. PATENT DOCUMENTS

| | | | |
|---|---|---|---|
| 7,212,821 B2 | 5/2007 | Laroia et al. | |
| 7,218,948 B2 | 5/2007 | Laroia et al. | |
| 7,245,935 B2 | 7/2007 | Lin et al. | |
| 7,260,054 B2 | 8/2007 | Olszewski | |
| 7,269,406 B2 | 9/2007 | Qi et al. | |
| 7,277,709 B2 | 10/2007 | Vadgama | |
| 7,277,737 B1 | 10/2007 | Vollmer et al. | |
| 7,280,814 B2 | 10/2007 | Austin et al. | |
| 7,283,559 B2 | 10/2007 | Cho et al. | |
| 7,283,836 B2 | 10/2007 | Hwang et al. | |
| 7,299,277 B1 | 11/2007 | Moran et al. | |
| 7,317,921 B2 | 1/2008 | Mueckenheim et al. | |
| 7,319,680 B2 | 1/2008 | Cho et al. | |
| 7,321,563 B2 | 1/2008 | Kim et al. | |
| 7,340,267 B2 | 3/2008 | Budka et al. | |
| 7,349,667 B2 * | 3/2008 | Magee et al. | 455/63.4 |
| 7,356,635 B2 | 4/2008 | Woodings et al. | |
| 7,362,702 B2 | 4/2008 | Terrell et al. | |
| 7,382,755 B2 | 6/2008 | Dugad et al. | |
| 7,395,058 B1 | 7/2008 | Kalofonos et al. | |
| 7,397,803 B2 | 7/2008 | Love et al. | |
| 7,400,901 B2 | 7/2008 | Kostic et al. | |
| 7,412,265 B2 | 8/2008 | Chen et al. | |
| 7,418,260 B2 | 8/2008 | Lucidarme et al. | |
| 7,420,939 B2 | 9/2008 | Laroia et al. | |
| 7,430,206 B2 | 9/2008 | Terry et al. | |
| 7,430,207 B2 | 9/2008 | Wu et al. | |
| 7,430,420 B2 | 9/2008 | Derakhshan et al. | |
| 7,447,148 B2 | 11/2008 | Gao et al. | |
| 7,463,577 B2 | 12/2008 | Sudo et al. | |
| 7,486,620 B2 | 2/2009 | Seol et al. | |
| 7,486,638 B2 | 2/2009 | Ofuji et al. | |
| 7,502,614 B2 | 3/2009 | Uchida et al. | |
| 7,508,792 B2 | 3/2009 | Petrovic et al. | |
| 7,510,828 B2 | 3/2009 | Lynn et al. | |
| 7,512,076 B2 | 3/2009 | Kwon et al. | |
| 7,512,185 B2 | 3/2009 | Sharon et al. | |
| 7,519,013 B2 | 4/2009 | Destino et al. | |
| 7,519,033 B2 | 4/2009 | Soomro et al. | |
| 7,522,544 B2 | 4/2009 | Cheng et al. | |
| 7,525,971 B2 | 4/2009 | Carroll et al. | |
| 7,526,091 B2 | 4/2009 | Jeong et al. | |
| 7,539,475 B2 | 5/2009 | Laroia et al. | |
| 7,558,235 B2 | 7/2009 | Lester et al. | |
| 7,558,572 B2 | 7/2009 | Anigstein | |
| 7,561,893 B2 | 7/2009 | Moulsley et al. | |
| 7,668,573 B2 | 2/2010 | Laroia et al. | |
| 7,743,284 B1 | 6/2010 | Taylor et al. | |
| 8,040,831 B2 | 10/2011 | Kurtz et al. | |
| RE43,593 E | 8/2012 | Kayama et al. | |
| 8,325,621 B2 | 12/2012 | Simonsson et al. | |
| 8,437,251 B2 | 5/2013 | Das et al. | |
| 2001/0036181 A1 | 11/2001 | Rogers | |
| 2001/0046878 A1 | 11/2001 | Chang et al. | |
| 2001/0055293 A1 | 12/2001 | Parsa et al. | |
| 2002/0012326 A1 | 1/2002 | Chang | |
| 2002/0031105 A1 | 3/2002 | Zeira et al. | |
| 2002/0037729 A1 | 3/2002 | Kitazawa et al. | |
| 2002/0045448 A1 | 4/2002 | Park et al. | |
| 2002/0049040 A1 | 4/2002 | Sugaya et al. | |
| 2002/0075835 A1 | 6/2002 | Krishnakumar et al. | |
| 2002/0077140 A1 | 6/2002 | Monogioudis et al. | |
| 2002/0080967 A1 | 6/2002 | Abdo et al. | |
| 2002/0082011 A1 | 6/2002 | Fujii et al. | |
| 2002/0085516 A1 | 7/2002 | Bridgelall | |
| 2002/0093953 A1 | 7/2002 | Naim et al. | |
| 2002/0107028 A1 | 8/2002 | Rantalainen et al. | |
| 2002/0122431 A1 | 9/2002 | Cho et al. | |
| 2002/0136195 A1 | 9/2002 | Kurtz et al. | |
| 2002/0142788 A1 | 10/2002 | Chawla et al. | |
| 2002/0143858 A1 | 10/2002 | Teague et al. | |
| 2002/0147017 A1 | 10/2002 | Li et al. | |
| 2002/0160802 A1 | 10/2002 | Hiramatsu et al. | |
| 2002/0177452 A1 | 11/2002 | Ruutu et al. | |
| 2002/0186678 A1 | 12/2002 | Averbuch et al. | |
| 2003/0003921 A1 | 1/2003 | Laakso et al. | |
| 2003/0007498 A1 | 1/2003 | Angle et al. | |
| 2003/0012212 A1 | 1/2003 | Earnshaw et al. | |
| 2003/0016641 A1 | 1/2003 | Terry et al. | |
| 2003/0023412 A1 | 1/2003 | Rappaport et al. | |
| 2003/0027587 A1 | 2/2003 | Proctor | |
| 2003/0064737 A1 | 4/2003 | Eriksson et al. | |
| 2003/0078067 A1 | 4/2003 | Kim et al. | |
| 2003/0095519 A1 | 5/2003 | Kuo et al. | |
| 2003/0100269 A1 | 5/2003 | Lehtinen et al. | |
| 2003/0114180 A1 | 6/2003 | Black et al. | |
| 2003/0123396 A1 | 7/2003 | Seo et al. | |
| 2003/0123410 A1 | 7/2003 | Youm | |
| 2003/0139197 A1 | 7/2003 | Kostic et al. | |
| 2003/0144042 A1 | 7/2003 | Weinfield et al. | |
| 2003/0157899 A1 | 8/2003 | Trossen et al. | |
| 2003/0169705 A1 | 9/2003 | Knisely et al. | |
| 2003/0185224 A1 | 10/2003 | Ramanan et al. | |
| 2003/0185285 A1 * | 10/2003 | Talwar | 375/148 |
| 2003/0193915 A1 | 10/2003 | Lee et al. | |
| 2003/0198204 A1 | 10/2003 | Taneja et al. | |
| 2003/0198206 A1 | 10/2003 | Cain et al. | |
| 2003/0206541 A1 | 11/2003 | Yun et al. | |
| 2003/0207691 A1 | 11/2003 | Chen | |
| 2003/0207693 A1 | 11/2003 | Roderique | |
| 2003/0214906 A1 | 11/2003 | Hu et al. | |
| 2003/0214928 A1 | 11/2003 | Chuah et al. | |
| 2003/0223354 A1 | 12/2003 | Olszewski et al. | |
| 2004/0001429 A1 | 1/2004 | Ma et al. | |
| 2004/0004954 A1 | 1/2004 | Terry et al. | |
| 2004/0013103 A1 | 1/2004 | Zhang et al. | |
| 2004/0057402 A1 | 3/2004 | Ramos et al. | |
| 2004/0062206 A1 | 4/2004 | Soong et al. | |
| 2004/0081089 A1 | 4/2004 | Ayyagari et al. | |
| 2004/0082344 A1 | 4/2004 | Moilanen et al. | |
| 2004/0085936 A1 | 5/2004 | Gopalakrishnan et al. | |
| 2004/0091026 A1 | 5/2004 | Nakayama | |
| 2004/0111640 A1 | 6/2004 | Baum | |
| 2004/0120411 A1 | 6/2004 | Walton et al. | |
| 2004/0125776 A1 | 7/2004 | Haugli et al. | |
| 2004/0127226 A1 | 7/2004 | Dugad et al. | |
| 2004/0131007 A1 * | 7/2004 | Smee et al. | 370/208 |
| 2004/0141466 A1 | 7/2004 | Kim et al. | |
| 2004/0147262 A1 | 7/2004 | Lescuyer et al. | |
| 2004/0147276 A1 | 7/2004 | Gholmieh et al. | |
| 2004/0160922 A1 | 8/2004 | Nanda et al. | |
| 2004/0162097 A1 | 8/2004 | Vijayan et al. | |
| 2004/0166869 A1 | 8/2004 | Laroia et al. | |
| 2004/0166886 A1 | 8/2004 | Laroia et al. | |
| 2004/0166887 A1 | 8/2004 | Laroia et al. | |
| 2004/0171401 A1 | 9/2004 | Balachandran et al. | |
| 2004/0180658 A1 | 9/2004 | Uchida et al. | |
| 2004/0184410 A1 | 9/2004 | Park | |
| 2004/0192371 A1 | 9/2004 | Zhao et al. | |
| 2004/0196802 A1 | 10/2004 | Bae et al. | |
| 2004/0203717 A1 | 10/2004 | Wingrowicz et al. | |
| 2004/0203981 A1 | 10/2004 | Budka et al. | |
| 2004/0218617 A1 | 11/2004 | Sagfors | |
| 2004/0223455 A1 | 11/2004 | Fong et al. | |
| 2004/0224677 A1 | 11/2004 | Kuchibhotla et al. | |
| 2004/0228313 A1 | 11/2004 | Cheng et al. | |
| 2004/0233838 A1 | 11/2004 | Sudo et al. | |
| 2004/0235510 A1 | 11/2004 | Elicegui et al. | |
| 2004/0248518 A1 | 12/2004 | Kashiwase | |
| 2004/0248568 A1 | 12/2004 | Lucidarme et al. | |
| 2004/0252647 A1 | 12/2004 | Chang et al. | |
| 2004/0252662 A1 | 12/2004 | Cho et al. | |
| 2004/0253996 A1 | 12/2004 | Chen et al. | |
| 2004/0258040 A1 | 12/2004 | Joshi et al. | |
| 2004/0259546 A1 | 12/2004 | Balachandran et al. | |
| 2004/0264414 A1 | 12/2004 | Dorenbosch | |
| 2004/0266474 A1 | 12/2004 | Petrus et al. | |
| 2005/0003847 A1 | 1/2005 | Love et al. | |
| 2005/0008892 A1 | 1/2005 | Yamamoto | |
| 2005/0037775 A1 | 2/2005 | Moeglein et al. | |
| 2005/0047344 A1 | 3/2005 | Seol et al. | |
| 2005/0047393 A1 | 3/2005 | Liu et al. | |
| 2005/0047416 A1 | 3/2005 | Heo et al. | |
| 2005/0053099 A1 | 3/2005 | Spear et al. | |

(56) References Cited

U.S. PATENT DOCUMENTS

| | | |
|---|---|---|
| 2005/0058637 A1 | 3/2005 | Lynn |
| 2005/0064821 A1 | 3/2005 | Hedberg et al. |
| 2005/0068922 A1 | 3/2005 | Jalali |
| 2005/0085197 A1 | 4/2005 | Laroia et al. |
| 2005/0099987 A1 | 5/2005 | Lester et al. |
| 2005/0111361 A1 | 5/2005 | Hosein et al. |
| 2005/0111462 A1 | 5/2005 | Walton et al. |
| 2005/0118993 A1 | 6/2005 | Roux et al. |
| 2005/0122900 A1 | 6/2005 | Tuulos et al. |
| 2005/0124345 A1 | 6/2005 | Laroia et al. |
| 2005/0128999 A1 | 6/2005 | Kwon et al. |
| 2005/0135320 A1 | 6/2005 | Tiedemann Jr. et al. |
| 2005/0136937 A1 | 6/2005 | Qian et al. |
| 2005/0143084 A1 | 6/2005 | Cheng et al. |
| 2005/0143114 A1 | 6/2005 | Moulsley et al. |
| 2005/0152320 A1 | 7/2005 | Marinier et al. |
| 2005/0157803 A1 | 7/2005 | Kim et al. |
| 2005/0157876 A1 | 7/2005 | Jeong et al. |
| 2005/0170782 A1 | 8/2005 | Rong et al. |
| 2005/0181732 A1 | 8/2005 | Kang et al. |
| 2005/0185632 A1 | 8/2005 | Draves Jr. et al. |
| 2005/0195765 A1 | 9/2005 | Sharon et al. |
| 2005/0201331 A1 | 9/2005 | Gaal et al. |
| 2005/0201353 A1 | 9/2005 | Lee et al. |
| 2005/0207335 A1 | 9/2005 | Schmidl et al. |
| 2005/0207359 A1 | 9/2005 | Hwang et al. |
| 2005/0207373 A1 | 9/2005 | Roy et al. |
| 2005/0220052 A1 | 10/2005 | Uehara et al. |
| 2005/0232154 A1 | 10/2005 | Bang et al. |
| 2005/0243938 A1 | 11/2005 | Armstrong et al. |
| 2005/0249118 A1 | 11/2005 | Terry et al. |
| 2005/0250509 A1 | 11/2005 | Choksi et al. |
| 2005/0250510 A1 | 11/2005 | Kaikkonen et al. |
| 2005/0250529 A1 | 11/2005 | Funnell et al. |
| 2005/0255873 A1 | 11/2005 | Zhang et al. |
| 2005/0259662 A1 | 11/2005 | Kim et al. |
| 2005/0265301 A1 | 12/2005 | Heo et al. |
| 2005/0281232 A1 | 12/2005 | Kim et al. |
| 2005/0281278 A1 | 12/2005 | Black et al. |
| 2005/0289256 A1 | 12/2005 | Cudak et al. |
| 2006/0003767 A1 | 1/2006 | Kim et al. |
| 2006/0015357 A1 | 1/2006 | Cagan |
| 2006/0018284 A1 | 1/2006 | Rudolf et al. |
| 2006/0019694 A1 | 1/2006 | Sutivong et al. |
| 2006/0034174 A1 | 2/2006 | Nishibayashi et al. |
| 2006/0040696 A1 | 2/2006 | Lin et al. |
| 2006/0045013 A1 | 3/2006 | Vannithamby et al. |
| 2006/0056346 A1 | 3/2006 | Vadgama et al. |
| 2006/0073836 A1 | 4/2006 | Laroia et al. |
| 2006/0079257 A1 | 4/2006 | Iochi et al. |
| 2006/0079267 A1 | 4/2006 | Kim et al. |
| 2006/0083161 A1 | 4/2006 | Laroia et al. |
| 2006/0089104 A1 | 4/2006 | Kaikkonen et al. |
| 2006/0092881 A1 | 5/2006 | Laroia et al. |
| 2006/0104240 A1 | 5/2006 | Sebire et al. |
| 2006/0120470 A1 | 6/2006 | Hwang et al. |
| 2006/0126497 A1 | 6/2006 | Na et al. |
| 2006/0128410 A1 | 6/2006 | Derryberry et al. |
| 2006/0128412 A1 | 6/2006 | Mantha et al. |
| 2006/0133346 A1 | 6/2006 | Chheda et al. |
| 2006/0135193 A1 | 6/2006 | Ratasuk et al. |
| 2006/0140154 A1 | 6/2006 | Kwak et al. |
| 2006/0142032 A1 | 6/2006 | Derakhshan et al. |
| 2006/0164981 A1 | 7/2006 | Olsson et al. |
| 2006/0165029 A1 | 7/2006 | Melpignano et al. |
| 2006/0176807 A1 | 8/2006 | Wu et al. |
| 2006/0182022 A1 | 8/2006 | Abedi |
| 2006/0203765 A1 | 9/2006 | Laroia et al. |
| 2006/0205356 A1 | 9/2006 | Laroia et al. |
| 2006/0205396 A1 | 9/2006 | Laroia et al. |
| 2006/0215604 A1 | 9/2006 | Mueckenheim et al. |
| 2006/0234722 A1 | 10/2006 | Hanebeck et al. |
| 2006/0245452 A1 | 11/2006 | Frederiksen et al. |
| 2006/0246916 A1 | 11/2006 | Cheng et al. |
| 2006/0256747 A1 | 11/2006 | Jaakkola |
| 2006/0270399 A1 | 11/2006 | Qi et al. |
| 2006/0285481 A1 | 12/2006 | Lane et al. |
| 2006/0287743 A1 | 12/2006 | Sampath et al. |
| 2007/0002757 A1 | 1/2007 | Soomro et al. |
| 2007/0002806 A1 | 1/2007 | Soomro et al. |
| 2007/0004437 A1 | 1/2007 | Harada et al. |
| 2007/0010226 A1 | 1/2007 | Laroia et al. |
| 2007/0015541 A1 | 1/2007 | Dominique et al. |
| 2007/0026803 A1 | 2/2007 | Malm et al. |
| 2007/0026808 A1 | 2/2007 | Love et al. |
| 2007/0026810 A1 | 2/2007 | Love et al. |
| 2007/0030828 A1 | 2/2007 | Vimpari et al. |
| 2007/0036116 A1 | 2/2007 | Eiger et al. |
| 2007/0054624 A1 | 3/2007 | Kashiwagi |
| 2007/0057952 A1 | 3/2007 | Swedberg et al. |
| 2007/0066273 A1 | 3/2007 | Laroia et al. |
| 2007/0070894 A1 | 3/2007 | Wang et al. |
| 2007/0081492 A1 | 4/2007 | Petrovic et al. |
| 2007/0081498 A1 | 4/2007 | Niwano et al. |
| 2007/0104128 A1 | 5/2007 | Laroia et al. |
| 2007/0104164 A1 | 5/2007 | Laroia et al. |
| 2007/0109999 A1 | 5/2007 | Brunner |
| 2007/0133412 A1 | 6/2007 | Hutter et al. |
| 2007/0140168 A1 | 6/2007 | Laroia et al. |
| 2007/0140179 A1 | 6/2007 | Zhang et al. |
| 2007/0141994 A1 | 6/2007 | Cheng et al. |
| 2007/0147283 A1 | 6/2007 | Laroia et al. |
| 2007/0147377 A1 | 6/2007 | Laroia et al. |
| 2007/0149126 A1 | 6/2007 | Rangan et al. |
| 2007/0149128 A1 | 6/2007 | Das et al. |
| 2007/0149129 A1 | 6/2007 | Das et al. |
| 2007/0149131 A1 | 6/2007 | Li et al. |
| 2007/0149132 A1 | 6/2007 | Li et al. |
| 2007/0149137 A1 | 6/2007 | Richardson et al. |
| 2007/0149138 A1 | 6/2007 | Das et al. |
| 2007/0149194 A1 | 6/2007 | Das et al. |
| 2007/0149227 A1 | 6/2007 | Parizhsky et al. |
| 2007/0149228 A1 | 6/2007 | Das et al. |
| 2007/0149238 A1 | 6/2007 | Das et al. |
| 2007/0159969 A1 | 7/2007 | Das et al. |
| 2007/0168326 A1 | 7/2007 | Das et al. |
| 2007/0173208 A1 | 7/2007 | Nishio et al. |
| 2007/0177510 A1 | 8/2007 | Natarajan et al. |
| 2007/0183308 A1 | 8/2007 | Korobkov et al. |
| 2007/0243882 A1 | 10/2007 | Edge |
| 2007/0249287 A1 | 10/2007 | Das et al. |
| 2007/0249360 A1 | 10/2007 | Das et al. |
| 2007/0253355 A1 | 11/2007 | Hande et al. |
| 2007/0253357 A1 | 11/2007 | Das et al. |
| 2007/0253358 A1 | 11/2007 | Das et al. |
| 2007/0253385 A1 | 11/2007 | Li et al. |
| 2007/0253449 A1 | 11/2007 | Das et al. |
| 2007/0258365 A1 | 11/2007 | Das et al. |
| 2008/0031368 A1 | 2/2008 | Lindoff et al. |
| 2008/0037474 A1 | 2/2008 | Niwano |
| 2008/0051086 A2 | 2/2008 | Etemad et al. |
| 2008/0057969 A1 | 3/2008 | Agami et al. |
| 2008/0076462 A1 | 3/2008 | Iochi et al. |
| 2008/0144521 A1 | 6/2008 | Soomro et al. |
| 2008/0159235 A1 | 7/2008 | Son et al. |
| 2008/0167047 A1 | 7/2008 | Abedi |
| 2008/0212524 A1 | 9/2008 | Niwano |
| 2009/0004983 A1 | 1/2009 | Darabi et al. |
| 2009/0034455 A1 | 2/2009 | Lee et al. |
| 2009/0103507 A1 | 4/2009 | Gu et al. |
| 2009/0106507 A1 | 4/2009 | Skerlj et al. |
| 2009/0252122 A1 | 10/2009 | Leinonen et al. |
| 2009/0303900 A1 | 12/2009 | Cho et al. |
| 2010/0177731 A1 | 7/2010 | Ananthaiyer et al. |
| 2010/0220626 A1 | 9/2010 | Das et al. |
| 2011/0090812 A1 | 4/2011 | Aoyama |
| 2011/0149789 A1 | 6/2011 | Edge |
| 2012/0140756 A1 | 6/2012 | Rudolf et al. |
| 2013/0230027 A1 | 9/2013 | Das et al. |
| 2013/0242888 A1 | 9/2013 | Das et al. |
| 2015/0043374 A1 | 2/2015 | Hande et al. |
| 2015/0333948 A1 | 11/2015 | Richardson |

(56) References Cited

U.S. PATENT DOCUMENTS

| | | |
|---|---|---|
| 2015/0334590 A1 | 11/2015 | Das |
| 2016/0255633 A1 | 9/2016 | Parizhsky |

FOREIGN PATENT DOCUMENTS

| | | |
|---|---|---|
| CN | 1265792 | 9/2000 |
| CN | 1286006 A | 2/2001 |
| CN | 1286821 A | 3/2001 |
| CN | 1286832 A | 3/2001 |
| CN | 1316140 | 10/2001 |
| CN | 1335036 A | 2/2002 |
| CN | 1338877 A | 3/2002 |
| CN | 1338878 A | 3/2002 |
| CN | 1507708 | 6/2004 |
| CN | 1545252 A | 11/2004 |
| CN | 1604685 | 4/2005 |
| CN | 1684457 A | 10/2005 |
| DE | 10162564 A1 | 7/2003 |
| EP | 1037419 A2 | 9/2000 |
| EP | 1037491 A1 | 9/2000 |
| EP | 1054518 A1 | 11/2000 |
| EP | 1089500 A2 | 4/2001 |
| EP | 1179962 | 2/2002 |
| EP | 1180881 | 2/2002 |
| EP | 1180907 A2 | 2/2002 |
| EP | 1207645 A1 | 5/2002 |
| EP | 1221273 A1 | 7/2002 |
| EP | 1233637 | 8/2002 |
| EP | 1377100 A2 | 1/2004 |
| EP | 1493284 A1 | 1/2005 |
| EP | 1511245 A2 | 3/2005 |
| EP | 1564953 A2 | 8/2005 |
| EP | 1571762 A1 | 9/2005 |
| EP | 1594260 A1 | 11/2005 |
| EP | 1758276 A1 | 2/2007 |
| EP | 1841259 A2 | 10/2007 |
| GB | 2340693 | 2/2000 |
| JP | 8008806 | 1/1996 |
| JP | 8503591 | 4/1996 |
| JP | 9275582 A | 10/1997 |
| JP | 09307939 | 11/1997 |
| JP | 10022975 A | 1/1998 |
| JP | 10173585 | 6/1998 |
| JP | 11122167 | 6/1998 |
| JP | 2000049689 | 2/2000 |
| JP | 2001007761 | 1/2001 |
| JP | 2001016152 | 1/2001 |
| JP | 2001510974 | 8/2001 |
| JP | 2001512921 T | 8/2001 |
| JP | 2001251680 A | 9/2001 |
| JP | 2001523901 T | 11/2001 |
| JP | 2001525135 T | 12/2001 |
| JP | 2002077992 | 3/2002 |
| JP | 2002111627 A | 4/2002 |
| JP | 2002262330 A | 9/2002 |
| JP | 2003018641 A | 1/2003 |
| JP | 2003500911 | 1/2003 |
| JP | 2003509983 A | 3/2003 |
| JP | 2003510887 | 3/2003 |
| JP | 2003520153 A | 7/2003 |
| JP | 2003244161 | 8/2003 |
| JP | 2004153585 | 5/2004 |
| JP | 2004297284 A | 10/2004 |
| JP | 2004533731 | 11/2004 |
| JP | 2004350052 | 12/2004 |
| JP | 2005073276 A | 3/2005 |
| JP | 2005130482 | 5/2005 |
| JP | 2005136773 A | 5/2005 |
| JP | 2005142965 A | 6/2005 |
| JP | 2005525730 A | 8/2005 |
| JP | 2005526417 A | 9/2005 |
| JP | 2005333671 | 12/2005 |
| JP | 2006514735 A | 5/2006 |
| JP | 2006518578 A | 8/2006 |
| JP | 06268574 A | 10/2006 |
| JP | 2006524966 T | 11/2006 |
| JP | 2006526323 A | 11/2006 |
| JP | 2007503156 A | 2/2007 |
| JP | 2007509531 A | 4/2007 |
| JP | 2007514364 A | 5/2007 |
| JP | 2007514378 T | 5/2007 |
| JP | 2007522692 A | 8/2007 |
| JP | 2007525044 A | 8/2007 |
| JP | 2007525045 T | 8/2007 |
| JP | 2011045054 | 3/2011 |
| KR | 1019990084525 | 12/1999 |
| KR | 20010014223 | 2/2001 |
| KR | 20040018526 | 3/2004 |
| KR | 20040053859 A | 6/2004 |
| KR | 20040084599 A | 10/2004 |
| KR | 20040110044 A | 12/2004 |
| KR | 20050021083 A | 3/2005 |
| KR | 20050023187 A | 3/2005 |
| KR | 20050039376 A | 4/2005 |
| KR | 1020050099633 | 10/2005 |
| KR | 1020050121274 | 12/2005 |
| KR | 20060012282 A | 2/2006 |
| RU | 2149518 | 5/2000 |
| RU | 2181529 | 4/2002 |
| RU | 2188506 | 8/2002 |
| RU | 2202154 | 4/2003 |
| TW | 200423642 | 11/2004 |
| WO | WO-9408432 | 4/1994 |
| WO | WO9623371 | 8/1996 |
| WO | WO9845967 A2 | 10/1998 |
| WO | WO9856120 A2 | 12/1998 |
| WO | WO-9907090 A1 | 2/1999 |
| WO | WO-9909779 A1 | 2/1999 |
| WO | WO9913600 A1 | 3/1999 |
| WO | WO9959254 A2 | 11/1999 |
| WO | WO-0001188 A1 | 1/2000 |
| WO | WO0101610 A1 | 1/2001 |
| WO | WO-0122759 A1 | 3/2001 |
| WO | WO0135548 | 5/2001 |
| WO | WO-0142047 A2 | 6/2001 |
| WO | WO0182504 | 11/2001 |
| WO | WO-0199291 A2 | 12/2001 |
| WO | 02033841 | 4/2002 |
| WO | WO0232183 A1 | 4/2002 |
| WO | WO0239760 A2 | 5/2002 |
| WO | WO0249305 | 6/2002 |
| WO | WO02073831 A1 | 9/2002 |
| WO | 02104058 | 12/2002 |
| WO | WO02101941 A2 | 12/2002 |
| WO | WO03094544 A1 | 11/2003 |
| WO | WO03105498 A1 | 12/2003 |
| WO | WO-2004031918 A2 | 4/2004 |
| WO | WO2004077685 A2 | 9/2004 |
| WO | WO2004084452 | 9/2004 |
| WO | WO2004084503 A2 | 9/2004 |
| WO | WO-2004084575 A2 | 9/2004 |
| WO | 2004098072 A2 | 11/2004 |
| WO | WO2004100450 A1 | 11/2004 |
| WO | WO2004105420 A1 | 12/2004 |
| WO | WO2004110081 A1 | 12/2004 |
| WO | WO-2005018115 A1 | 2/2005 |
| WO | 2005020490 | 3/2005 |
| WO | WO2005034438 | 4/2005 |
| WO | WO-2005039119 A1 | 4/2005 |
| WO | 05060277 | 6/2005 |
| WO | 2005057812 A1 | 6/2005 |
| WO | 2005060271 | 6/2005 |
| WO | WO2005060132 A1 | 6/2005 |
| WO | WO2005065056 A2 | 7/2005 |
| WO | WO2005069519 | 7/2005 |
| WO | WO-2005107311 A1 | 11/2005 |
| WO | WO2005125049 | 12/2005 |
| WO | WO2006075293 A1 | 7/2006 |

(56) References Cited

FOREIGN PATENT DOCUMENTS

| WO | WO2007031956 A2 | 3/2007 |
|---|---|---|
| WO | 06044718 | 4/2008 |

OTHER PUBLICATIONS

International Search Report—PCT/USO4/0005242, International Search Authority—U.S. Patent Office—Jun. 14, 2006.
Gunnarson, F. et al.: "Uplink Admission Control in WCDMA Based on Relative Load Estimates", IEEE International Conference on Communications, vol. 1, pp. 3091-3095, IEEE, New York, NY USA (Apr. 28, 2002).
International Preliminary Report on Patentability, PCT/US2004/005242—International Search Authority—The International Bureau of WIPO—Geneva, Switzerland—Jul. 31, 2006.
Written Opinion, PCT/US2004/0005242—International Search Authority—US—Jun. 14, 2006.
Written Opinion, PCT/US/04/0005241—International Search Authority—US—Oct. 15, 2004.
Hosein, et al., "Optimal Assignment of Mobile Station Serving Sector for the Forward Link of a Time-Shared Wireless Packet Data Channel," Fifth IEE International Conference on 3G Mobile Communication Technologies (3G 2004), Oct. 18-20, 2004, pp. 654-658.
Kwon, et al., "Quasi-Dedicated Access Scheme for Uplink Realtime Services in Future Wireless Communication Systems," Vehicular Technology Conference, 2005. VTC 2005—Spring. 2005 IEEE 61st Stockholm, Sweden, Apr. 20-May 1, 2005, Piscataway, NJ, USA, May 30, 2005, pp. 3117-3121.
Majmundar, "Impact of Mobile-Originated Short Message Service on the Digital Control Channel of TDMA Systems," Vehicular Technology Conference, 2000. IEEE VTS Fall VTC 2000. 52nd Sep. 24-28, 2000, Piscataway, NJ, USA, IEEE, Sep. 24, 2000, pp. 1550-1555.
Wada, "Study of an OFDM Cellular System Using a Single Band," 2002 Communication Society Convention, Collection of Lecture Papers 1, Japan, IEEE, Aug. 20, 2002, p. 355, B-5-58.
Hang Zhang et al, "Clean up for Closed-Loop MIMO in H-ARQ MAP IE", IEEE P802.16e/D7 Broadband Wireless Access Working Group <http://ieee802.org/16>, pp. 1-6, Mar. 10, 2010.
IEEE P802.16e/D5: "Draft IEEE Standard for Local and metropolitan area networks, Part 16: Air Interface for Fixed and Mobile Broadband Wireless Access Systems Amendment for Physical and Medium Access Control Layers for Combined Fixed and Mobile Operation in Licensed Bands", pp. 1-356, Sep. 2004.
IEEE P802.16e/D5: "Draft IEEE Standard for Local and metropolitan area networks, Part 16: Air Interface for Fixed and Mobile Broadband Wireless Access Systems Amendment for Physical and Medium Access Control Layers for Combined Fixed and Mobile Operation in Licensed Bands", pp. 184-190, Sep. 2004.
Supplementary European Search Report—EP04713434, Search Authority—The Hague Patent Office, Nov. 30, 2010.
Supplementary European Search Report—EP04713438, Search Authority—The Hague Patent Office, Nov. 30, 2010.
Translation of Office Action in Japanese application 2008-535789 corresponding to U.S. Appl. No. 11/549,611, citing JP2003244161, JP200277992 and JP2001016152 dated Jan. 18, 2011.
Translation of Office Action in Ukraine application 200508984 corresponding to U.S. Appl. No. 11/748,433, citing US20020160802, WO0232183, RU2181529, WO9845967, EP1377100, U.S. Pat. No. 5,867,478, US20010007552, U.S. Pat. No. 6,035,000 and U.S. Pat. No. 5,933,421 dated Dec. 9, 2010.
Translation of Office Action in Ukraine Application 201010406 corresponding to U.S. Appl. No. 11/748,433, citing U.S. Pat. No. 5,867,478, US20010007552, U.S. Pat. No. 6,035,000, U.S. Pat. No. 5,933,421, WO02073831, WO02032183, RU2181529 and EP1377100 dated Feb. 22, 2011.
3GPP: ETSI TS 125 331 V6.3.0: Radio Resource Control (RRC) protocol specification (3GPP TS 25.331 version 6.3.0 Release 6), ETSI TS 125 331, Sep. 1, 2004, pp. 49, 202-209, 220, 221, 406, 579-585, 589, 930.
Ericsson: Discussion on SIR Measurement, TSG-RAN Working Group 4 (Radio) meeting #18, Berlin, Germany, 3GPP TS 25.101 V3.7.0, Jul. 9, 2001, R4-010895, URL:http://www.3gpp.org/ftp/tsg_ran/WG4_Radio/TSGR4_18/Docs/R4-010895.zip.
TIM/TILAB, Blu, Mobilkom Austria, One2one,Telefonica: Re-introduction of SIR measurement, 3GPP TSG-RAN4 Meeting #17,3GPP, May 21, 2001, R4-010647, URL:http://www.3gpp.org/ftp/tsg_ran/WG4_Radio/TSGR4_17/Docs/R4-010647.Zip.
3GPP TSG RAN2#45bis. "EDCH Buffer Status Reporting," R2-050026, Sophia Antipolis, France, Jan. 10-14, 2005, URL:http://www.3gpp.org/ftp/tsg_ran/WG2_RL2/TSGR2_45bis/Dcs/R2-050026.zip.
3GPP TSG-RAN WG2 meeting #48. "Scheduling Information Contents," R2-051957, London, United Kingdom, Aug. 29, 2005, URL:http://3gpp.org/ftp/tsg_ran/WG2_RL2/TSGR2_48/Documents/R2-095517.zip.
Chang, Cheng-Ta: "Downlink Transmit Power Issues in a WCDMA Cellular System," Dec. 14, 2004, p. 3, Fig. 1, Retrieved online: http://wintech.ee.nctu.edu.tw/handoff/MediaTek/Material/Wintech/1214/Downlink%20Transmit%20Power%20Issues%20in%20a%20WCDMA%20Cellular%20System.pdf.
Gunnarsson, G. et al.,"Location Trial System for Mobile Phones," Global Telecommunications Conference, 1998. GLOBECOM 98. The Bridge to Global Integration. IEEE, vol. 4, pp. 2211-2216, Nov. 8-12, 1998.
Hobfeld, T. et al., "Supporting Vertical Handover by Using a Pastry Peer-to-Peer Overlay Network," Fourth Annual IEEE International Conference on Pervasive Computing and Communications Workshops, 2006. Percom Workshops 2006. Mar. 13-17, 2006, pp. 163-167, p. 164, paragraph III, IEEE, Piscataway, NJ, USA, XP010910514, ISBN: 0-7695-2520-2.
LG Electronics Inc., "Relative Buffer Status Reporting," 3GPP TSG-RAN WG2 meeting #46bis, R2-050852, Apr. 4, 2005, pp. 1-3, URL, http://www.3gpp.org/ftp/tsg_ran/WG2_RL2/TSGR2_46bis/Documents/R2-050852.zip.
Samsung: "Uplink control signaling structure (Revision of R1-041086)," 3GPP TSG-RAN WG1 Meeting #38bis, Tdoc R1-041222, 3GPP, Sep. 20, 2004, URL: http://www.3gpp.org/ftp/tsg_ran/WG1_RL1/TSGR1_38bis/Dcs/R1-041222.zip.

\* cited by examiner

1750

| 1 SYMBOL TIME | | | |
|---|---|---|---|
| TONE | A | B | C |
| 1 | 0 | 0 | 0 |
| 2 | 1 | 1 | 0 |
| 3 | 1 | 0 | 1 |
| 4 | 0 | 1 | 1 |
| 5 | 1 | D | D |
| 6 | 1 | D | D |
| 7 | D | 1 | D |
| 8 | D | 1 | D |
| 9 | D | D | 1 |
| 10 | D | D | 1 |

Fig. 18

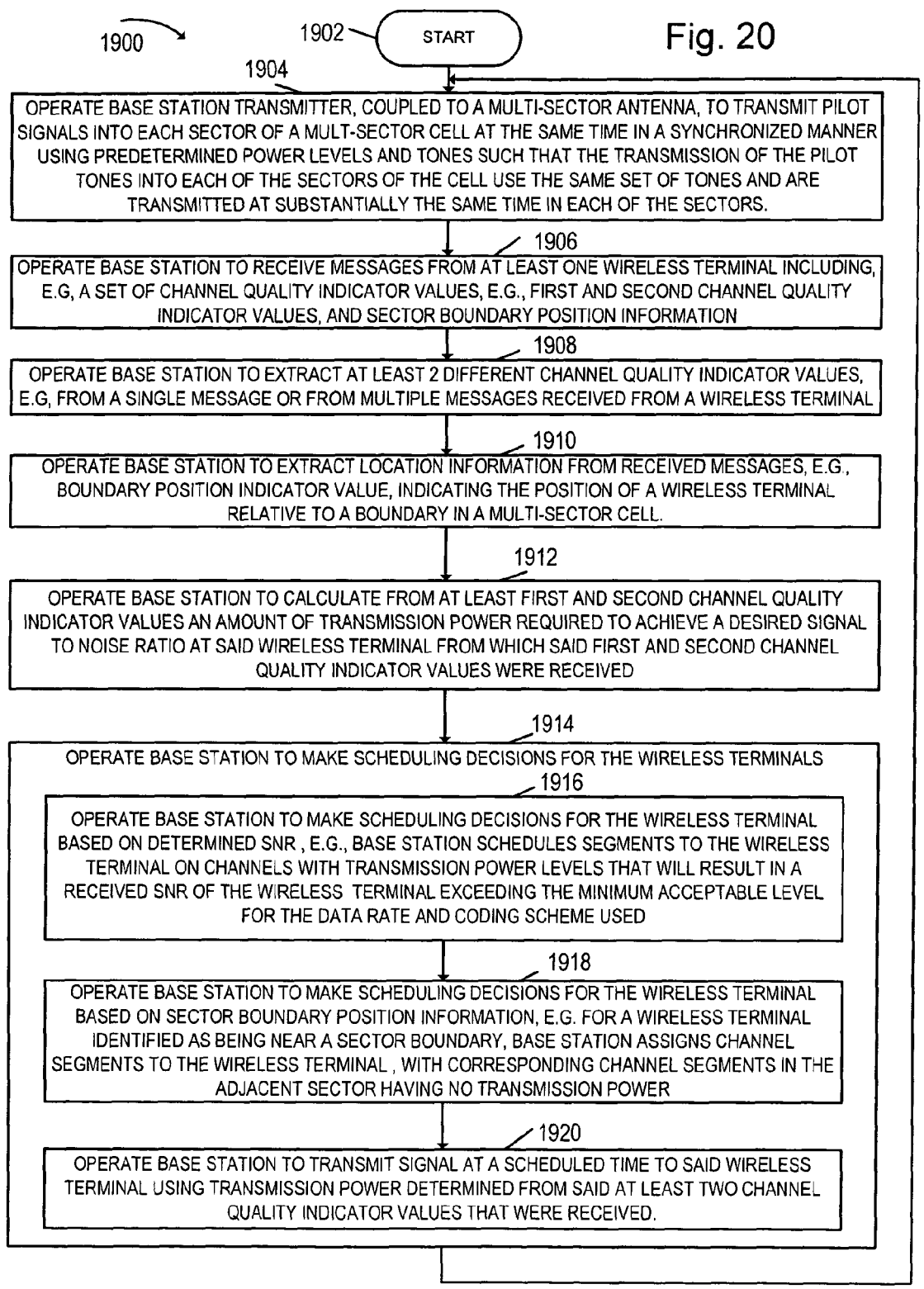

METHOD OF TRANSMITTING PILOT TONES IN A MULTI-SECTOR CELL, INCLUDING NULL PILOT TONES, FOR GENERATING CHANNEL QUALITY INDICATORS

RELATED APPLICATIONS

The present application is a continuation of U.S. patent application Ser. No. 10/648,766 which was filed on Aug. 25, 2003, which is hereby expressly incorporated by reference and which claims the benefit of U.S. Provisional Patent Application Ser. No. 60/449,729 filed Feb. 24, 2003.

FIELD OF THE INVENTION

The present invention is directed to wireless communications systems and, more particularly, to methods and apparatus for transmitting pilot signals in a multi-sector cell, e.g., a cell with synchronized sector transmissions.

BACKGROUND OF THE INVENTION

In a wireless communications system, e.g. a cellular system, the channel conditions are an important consideration in the operation of the wireless system. Within a wireless communications system, a base station (BS) communicates with a plurality of wireless terminals (WTs), e.g., mobile nodes. As a wireless terminal moves to different locations within the base station's cell, the condition of the wireless communication channel between the base station and the wireless terminal may change, e.g., due to varying levels of noise and interference. The noise and interference experienced by the wireless terminal's receiver may include background noise, self-noise, and inter-sector interference. The background noise may be classified as independent from the base station's transmission power level. However, the self-noise and inter-sector interference are dependent on the base station's transmission power level, e.g. the transmission power in one or more sectors.

One method typically used to evaluate the condition of the communication channel is for the base station to transmit pilot signals, which are signals typically transmitted on a small fraction of the transmission resource and are generally comprised of known (pre-determined) symbols transmitted at a single constant power level. The wireless terminal measures the pilot signals and reports to the BS in the form of a scalar ratio such as signal-to-noise ratio (SNR) or an equivalent metric. In the case where noise/interference is not dependent on the transmitted signal, e.g., background noise is predominant and the contribution from self-noise and inter-sector interference is insignificant, such a single scalar metric is sufficient for the BS to predict how the received SNR, at the wireless terminal, will change with signal transmit power. Then, the base station can determine the minimum level of transmission power required to achieve an acceptable received SNR at the wireless terminal, for the particular error-correcting coding scheme and modulation used. However, in the case where the total noise/interference includes a significant component that is dependent on signal transmission power, e.g., inter-sector interference from base station transmissions in adjacent sectors, the commonly used technique of obtaining an SNR from pilot signals of one fixed strength level is insufficient. In such a case, the information obtained, e.g., SNR at a single transmission power level, by this commonly used technique, is insufficient and inadequate for the BS to accurately predict the received SNR at the WT as a function of the signal transmit power. Additional channel quality information needs to be generated, collected by the wireless terminal, and relayed to the base station, so that the base station can solve for the wireless terminals' function relating received SNR to base station signal transmission power level. By obtaining such a function for a wireless terminal's communication channel, the base station's scheduler, knowing the acceptable level of received SNR for a particular coding rate, error-correcting code, and modulation used, could efficiently assign a wireless terminal segments in a channel with an appropriate power level, thus achieving acceptable SNR, limiting wasted transmission power, and/or reducing overall levels of interference.

Based upon the above discussion, it is clear that there is a need, particularly in the case of multi-sector wireless communications systems, for new and novel apparatus and methods of channel quality measuring, evaluating and reporting that will provide the base station with sufficient information to obtain the wireless terminal received signal SNR as a function of base station transmitted power. In addition, to support improved and/or more diverse channel quality measurements, new pilot signal patterns, sequences and/or pilot signal transmission power levels which can facilitate the analysis of self noise and interference form other sectors of a cell are desirable.

SUMMARY OF THE INVENTION

Improved pilot signal sequences which facilitate multiple channel quality measurements, e.g., through the use of different signal pilot transmission power levels, are described. In various implementations the transmitted pilot sequences facilitate determining the contribution of interference from other sectors of a cell using the same tones, e.g., in a synchronized manner, as the sector in which the pilot signal measurements are being made.

In cases where different sectors transmit on a tone at the same time using approximately the same power, signals from other sectors while being interference can be viewed as being similar or the same as self noise since transmission power affects the amount of noise that will be encountered in a sector.

To measure noise contributions from neighboring sectors a sector NULL pilot, e.g., a pilot with zero power, is transmitted in an adjacent sector at the same time a pilot signal with a pre-selected, and therefore known, non-zero power is transmitted in the sector where the received pilot signal measurement is made. To facilitate background noise measurements, a cell NULL is supported in some embodiments. In the case of a cell NULL, all sectors of a cell transmit a Null pilot, on a tone that is used to measure background noise. Since no power is transmitted in the cell on the tone during the measurement, any measured signal on the tone is attributable to noise, e.g., background noise which may include inter-cell interference.

The pilot sequences and signal measurements of the present invention provide mechanisms that enable a wireless terminal (WT), and a BS that receives channel condition feedback information from the WT, to predict downlink receive SNR for the WT as a function of the signal transmit power in the presence of signal dependent noise. Feedback from individual WTs, in accordance with the invention, normally includes at least two channel quality indicator values per WT, as opposed to a single SNR value, where each of the two channel quality indicator values is generated using a different function. One of the two channel quality indicator value generator functions has a first pilot signal measurement corresponding to a received pilot signal having a first known transmission power as an input. A second one of the two channel quality indicator value generator functions has as an input a second pilot signal measurement corresponding to another received pilot signal having a second known transmission power which is different from the first known transmission power. Each of the first and second channel quality indicator value generator functions, which may be implemented as software modules or as Feedback from individual hardware circuits, may also have additional inputs to those just mentioned.WTs, including at least two channel quality indicator values per WT that are generated using different functions, enables the base station (BS) to transmit to different WTs at different, e.g., minimum, signal powers depending upon the respective SNRs required at the receivers. The total power transmitted by the BS is typically known or fixed but the proportion allocated to different WTs may be different and may vary over time. At a WT receiver, the dependence of total noise as a function of the received signal power can be modeled by a straight line, referred to as the 'noise characteristic line' in this invention. Since the noise characteristic line does not in general go through the origin, a single scalar parameter is not enough to characterize this line. At least two parameters are required to determine this line.

The base station transmits pilot signals on the downlink. In accordance with the invention, by transmitting pilot signals of different strength levels, the noise characteristic line for the wireless terminal can be determined. In general a first pilot signal is transmitted at a first power level to obtain a first point, and a second pilot signal at a second power level, different from the first power level, is transmitted to obtain a second data point. The second power level can be zero in some embodiments. The above pilot signal scheme can be used in a cell using an omni-antenna, that is, a cell with only one sector.

The invention further determines SNR as a function of signal transmit power in a sectorized cellular environment. In one method of sectorization, each of the different sectors of a cell may use the entire or nearly the entire transmission resource (for example, frequency band) to transmit in each of the sectors. The total power transmitted from each sector is typically fixed or known, but different WTs may receive signal with different power. Since the isolation between the sectors is not perfect, signals transmitted on one sector may become noise (interference) to other sectors. Furthermore, if each of the sectors is constrained to transmit identical or nearly identical signal power (or to transmit signal power in a fixed proportion across the different sectors) on a given degree of freedom (e.g., time slot), the interference from other sectors to a WT in a given sector has the characteristics of signal-dependent noise or self-noise. This is particularly the case when the interference from other sectors scales with signal power which occurs in embodiment where different sectors are constrained to transmit identical or proportional power on a given degree of freedom, e.g., tones in an OFDM multiple access system.

In accordance with the invention, regular pilots at different predetermined and known strength levels, are transmitted from the base station to the wireless terminals to characterize the dependence of total noise at a WT on the power of the signal by the BS to the WT. Different sectors may be, and often are, controlled to transmit at least some pilots on the same tone at the same time. Different sectors are often controlled to use different predetermined transmission power levels for the pilot signal transmitted on a tone in each of the sectors. For example, on tone 1 at time T1, a first sector may be controlled to transmit a pilot signal at a first power level while an adjacent sector is controlled to transmit at the same time T1, a pilot signal at a second power level on tone 1, the second power level being different from the first power level.

According to one embodiment of this invention, 'cell null pilots' are used in conjunction with regular pilots to characterize the dependence of total noise at a WT on the power of the signal transmitted by the BS to that WT. Cell null pilots are downlink resources (degrees of freedom) where none of the sectors of the cell transmit any power. Noise measured on these degrees of freedom provides an estimate of the signal-independent noise at the WT. Regular pilots (or simply pilots) are resources (degrees of freedom) where each sector of the cell transmits known symbols using fixed or predetermined powers. Noise measured on the pilots thus includes inter-sector interference and provides an estimate of the total noise, including signal-dependent noise.

One feature of the invention is directed to the concept of a 'sector null pilot'. The sector null pilots can be used in a sectorized cellular wireless system to estimate the noise at the WT, for example, when the WT is at the boundary of two sectors and the scheduling between the sectors is coordinated so that the WT at the boundary does not receive any interference from the other sector. Sector null pilot can be downlink resources where one sector in a cell does not transmit any signal energy and the rest or an adjoining sector transmits regular, e.g., non-zero pilots.

More generally, other types of sector null pilots can be defined, such as where a subset of the sectors of a cell transmits no signal on downlink resources and the remaining sectors transmit regular pilots. Also, more generally, the coordinated scheduling amongst the sectors can be such that the BS reduces (but does not necessarily eliminate) the transmit power on some sectors in order to reduce the interference that a WT receives from other sectors. In some cases, data is transmitted on a tone in an adjacent sector to a sector which transmits a pilot signal on the tone.

With the help of various regular strength pilots and/or various null pilot types, a WT can estimate the noise at the receiver as a function of the power of the signal transmitted to that WT under various conditions. The invention also concerns itself with the communication of this information from the WT to the BS in order to enable the BS to determine the power to be used for transmitting to the different WTs in both omni-cell and sectorized cell environments. Unlike prior art, the channel quality information is not a single scalar value but includes two or more values which can be used to reflect the effect of self noise and/or inter-sector noise in addition to background noise.

In an embodiment of the invention for an OFDM based cellular wireless system the pilots include known symbols that are transmitted by the base station on specified tones (and specified symbol times) at a fixed or predetermined power, and the null pilots are typically tones that are left empty, i.e., with zero transmission power.

In an embodiment used in an omni-directional antenna deployment, known herein as an "omni cell," the WT measures the SNR on the pilot tones, which includes all noise/interference sources, including noise that is dependent on the pilot's transmit power. In addition, the WT also measures the noise using the cell null pilot tone(s). Taking the ratio of the received pilot power with this noise measurement gives an SNR that is limited to signal-independent noise/interference. The WT transmits back to the BS these two SNR values, or some equivalent combination of statistics.

In the embodiment of a sectorized deployment with directional sector antennas, a single cell is divided into multiple sectors, some or all of which may be sharing the same frequency band (degrees of freedom), corresponding to a frequency reuse of 1. In this situation, in addition to the cell null pilot, the invention describes the use of sector null pilots that are present in a subset of the sectors but not all sectors, and also gives a pattern for pilot tones such that a null pilot tone in one sector is time/frequency synchronized with a pilot tone in some or all of the other sectors. This allows the WT to measure two or more signal-to-noise ratios, which include interference from different combinations of sectors. On a reverse link, the WT reports a set of SNR-related statistics, which enables the BS to make an estimate of these received SNR levels at a WT as a function of the base station's transmit power. The BS uses the reported channel quality values to determine the power level at which to transmit to achieve a desired SNR at the WT.

In accordance with the invention, a wireless terminal makes measurements of at least two different received pilot signals, which were transmitted at different first and second pre-selected, and thus known, power levels. The two power levels may be, e.g., a fixed non-zero power level and a transmission power level of zero although other power level combinations are possible there being no mandatory requirement that one power level be a zero power level. The value obtained from measuring the first received pilot signal is processed by a first function to produce a first channel quality indicator value. The second measured signal value obtained from measuring the second received pilot signal is processed by a second function, which is different from the first function, to produce a second channel quality indicator value. The first and second channel quality indicator values are transmitted from the wireless terminal to the base station. In some embodiments, they are transmitted in a single message while in other embodiments they are transmitted in separate messages. The channel quality indicator values may be, e.g., SNR values or power values. Thus, the first and second channel quality indicator values may both be SNR values, may both be power values, or one may be an SNR value and one a power value. Other types of values may also be used as the channel quality indicator values with SNR and power values being exemplary.

In some embodiments the WT determines its location relative to a sector boundary and reports this location information to the base station. The location information is reported to the base station. The reported location information is normally in addition to the two channel quality indicator values is sometimes sent as a separate message. However, in some cases, the location information is transmitted in the same message as the two channel quality indicator values.

Numerous additional features, benefits and embodiments of the methods and apparatus of the present invention are discussed in the detailed description which follows.

BRIEF DESCRIPTION OF THE DRAWINGS

FIG. 18 illustrates a chart showing the transmission of signals on ten different tones during a single symbol transmission period in accordance with the present invention.

FIG. 20 is a flowchart illustrating the operation of an exemplary base station implementing the methods of the present invention.

DETAILED DESCRIPTION

Figure 11:
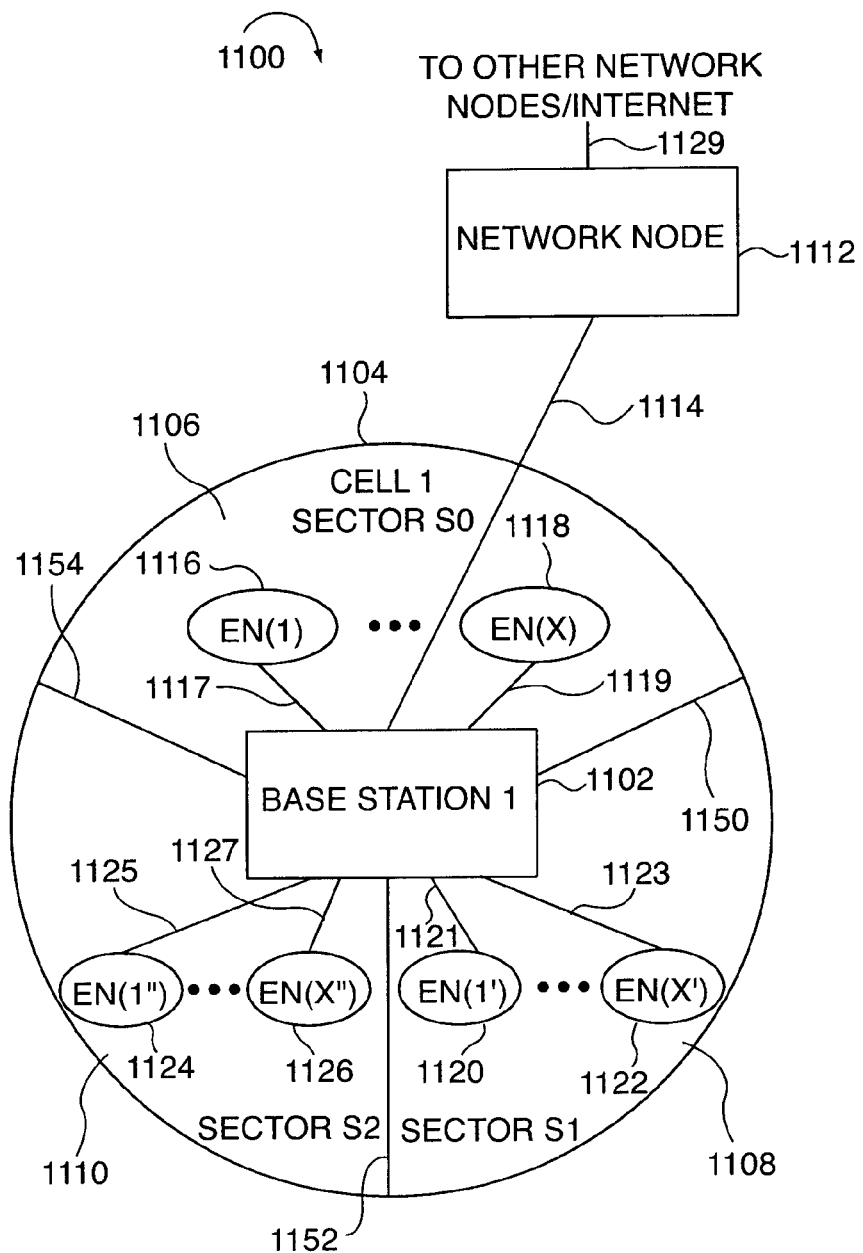
FIG. 11 illustrates an exemplary communications systems implementing the present invention.

The methods and apparatus of the present invention are well suited for use in a wireless communications system which uses one or more multi-sector cells. FIG. 11 illustrates an exemplary system 1100 with a single cell 1104 shown but it is to be understood that the system may, and often does, include many of such cells 1104. Each cell 1104 is divided into a plurality of N sectors wherein N is a positive integer greater than 1. System 1100 illustrates the case where each cell 1104 is subdivided into 3 sectors: a first sector S0 1106, a second sector S1 1108, and a third sector S2 1110. Cell 1104 includes a S0/S1 sector boundary 1150, a S1/S2 sector boundary 1152, and a S2/S0 sector boundary 1154. Sector boundaries are boundaries where the signals from multiple sectors, e.g., adjoining sectors, may be received at almost the same level making it difficult for a receiver to distinguish between transmissions from the sector in which it is located and the adjoining sector. In the cell 1104, multiple end nodes (ENs), e.g., wireless terminals (WTs), such as mobile nodes, communicate with a base station (BS) 1102. Cells with two sectors (N=2) and more than 3 sectors (N>3) are also possible. In sector S0 1106, a plurality of end nodes EN(1) 1116, EN (X) 1118 are coupled to base station 11102 via wireless links 1117, 1119, respectively. In sector S1 1108, a plurality of end nodes EN(1') 1120, EN (X') 1122 are coupled to base station 1 1102 via wireless links 1121, 1123, respectively. In sector S2 1110, a plurality of end nodes EN(1") 1124, EN (X") 1126 are coupled to base station 1 1102 via wireless links 1125, 1127, respectively. In accordance with the invention, the base station 1102 transmits pilot signals at multiple power levels to the ENs 1116, 1118, 1120, 1122, 1124, 1126, and there is synchronization of the transmission of pilot signals of various predetermined and known levels between the three sectors. In accordance with the invention, the end nodes, e.g., EN(1) 1116 report feedback information, e.g., channel quality indicator values to the base station 1102, allowing the base station 1102 to determine the wireless terminals received SNR as a function of base station transmitted signal power. Base station 1102 is coupled to a network node 1112 via network link 1114. The network node 1112 is coupled to other network nodes, e.g., intermediate nodes, other base station, AAA nodes, home agent nodes, etc., and the internet via network link 1129. Network node 1112 provides an interface outside cell 1104, so that ENs operating within the cell may communicate with peer nodes outside the cell 1104. The ENs within cell 1104 may move within the sectors 1106, 1108, 1110 of the cell 1104 or may move to another cell corresponding to another base station. Network links 1114 and 1129, maybe, e.g., fiber optic cables.

Figure 12:
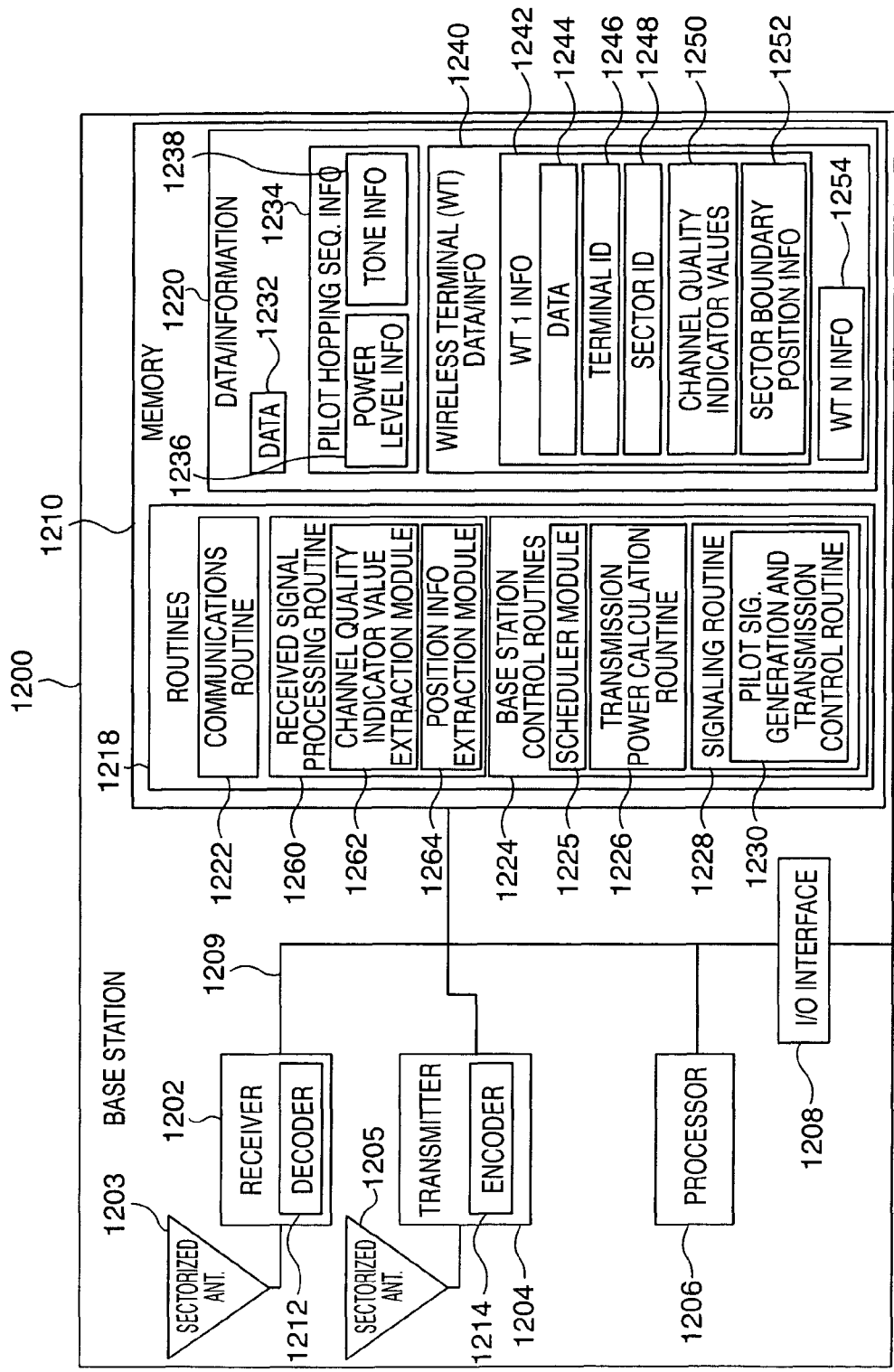
FIG. 12 illustrates an exemplary base station implemented in accordance with the present invention.

FIG. 12 illustrates an exemplary base station (BS) 1200, implemented in accordance with the invention. Base station 1200 is a more detailed representation of base station 1102 shown in the exemplary communication system 1100 of FIG. 11. The base station 1200 includes sectorized antennas 1203, 1205 coupled to receiver 1202 and transmitter 1204, respectively. The receiver 1202 includes a decoder 1212 while the transmitter 1204 includes an encoder 1214. Base station 1200 also includes an I/O interface 1208, a processor, e.g., CPU, 1206 and memory 1210. The transmitter 1204 is used to transmit pilot signals into multiple sectors in a synchronized manner via sectorized transmit antenna 1205. The receiver 1202, the transmitter 1204, the processor 1206, the I/O interface 1208, and the memory 1210 are couple together via bus 1209 over which the various elements can interchange data and information. The I/O interface 1208 couples the base station 1200 to the Internet and to other network nodes.

The memory 1210 includes routines 1218 and data/information 1220. Routines 1218, which when executed by the processor 1206, cause the base station 1200 to operate in accordance with the invention. Routines 1218 include communications routine 1222, a received signal processing routine 1260, and base station control routines 1224. The received signal processing routine 1260 includes a channel quality indicator value extraction module 1262 which extracts channel quality indicator values from received signals, e.g., WT report messages, and a position information extraction module 1264 for extracting WT position information from received messages. The position information, in some embodiments, indicates a WT's position relative to a sector boundary. Extracted channel quality indicator values, e.g., SNR or power values, are provided to the transmission power calculation routine 1226 for use in calculating transmission power for signals transmitted to a WT. The base station control routines 1224 include a scheduler module 1225, a transmission power calculation routine 1226, and signaling routines 1228 including a pilot signal generation and transmission control routine.

The data/information 1220 includes data 1232, pilot hopping sequence information 1234, and wireless terminal data/information 1240. Data 1232 may include data from the receiver's decoder 1212, data to be sent to the transmitter's encoder 1214, results of intermediate processing steps, etc. The pilot hopping sequence information 1234 includes power level information 1236 and tone information 1238. The power level information defines the different power levels that will be applied to different tones in order to generate pilots of various strengths, within the pilot tone hopping sequence in accordance with the invention. These pilot values are set e.g., preselected fixed values, prior to transmission and are known to both the BS 1200 and WTs in the cell serviced by the BS 1200. Tone info 1238, includes information defining which tones shall be used as pilot tones of a specific strength level, which tones shall be sector null tones, and which tones shall be cell null tones, within the pilot tone hopping sequence for each sector for each terminal ID 1246. Wireless terminal data/information 1240 includes sets of data information for each wireless terminal operating within the cell, WT 1 info 1242, WT N info 1254. Each set of info, e.g., WT1 info 1242 includes data 1244, terminal ID 1246, sector ID 1248, channel quality indicator values 1250, and sector boundary position info 1252. Data 1244 includes user data received from WT 1 and user data to be transmitted to a peer node communicating with WT 1. Terminal ID 1246 is a base station assigned Identification that has been assigned to WT 1; a specific pilot tone hopping sequence, including various strength pilot signals at predetermined times, is generated by the base station corresponding to each specific terminal ID 1246.

The sector ID 1248 identifies which of the three sectors, S0, S1, S2, WT 1 is operating in. The channel quality indicator values 1250 include information conveyed by WT 1 to the base station in channel quality report messages, that the base station may use to calculate the expected received WT1 SNR level as a function of base station transmission signal power. The channel quality indicator values 1250 are derived by WT1 from measurements performed by WT 1 on the various strength pilot signals transmitted by the base station, in accordance with the present invention. The sector boundary position information 1252 includes: information identifying whether WT1 has detected that it is near a sector boundary, experiencing high levels of interference and information identifying which sector boundary WT1 is located near. This information is obtained or derived from position feedback information transmitted by the WT1 and received by the BS. The channel quality indicator values 1250 and the sector boundary position information 1252 represent channel quality feedback information from the WT1 to the base station 1200, providing information about one or more downlink channels between the base station 1200 and WT1.

Figure 15:
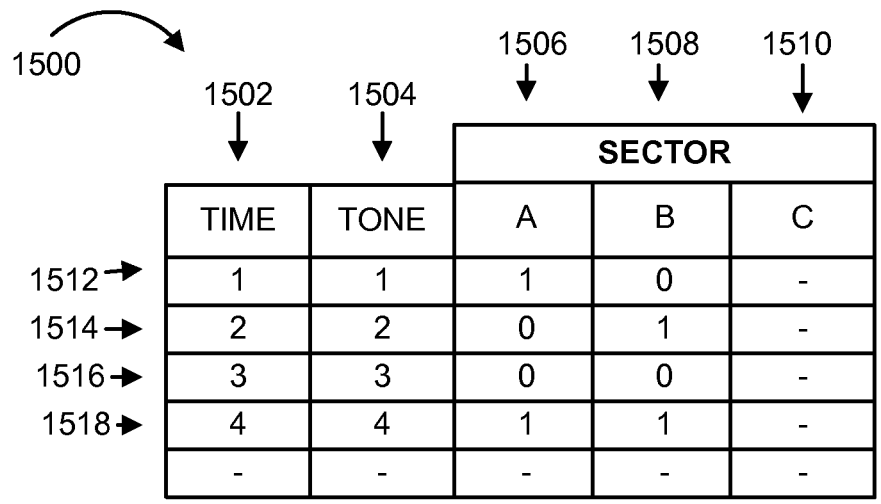
FIGS. 15-17 illustrate exemplary pilot tone transmissions along with pilot signal transmission power information in accordance with the present invention.
Figure 16:
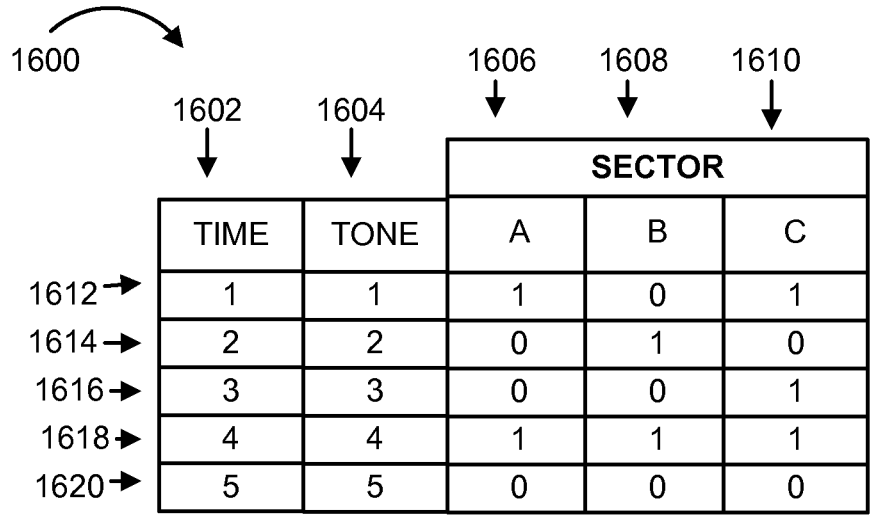
Figure 17:
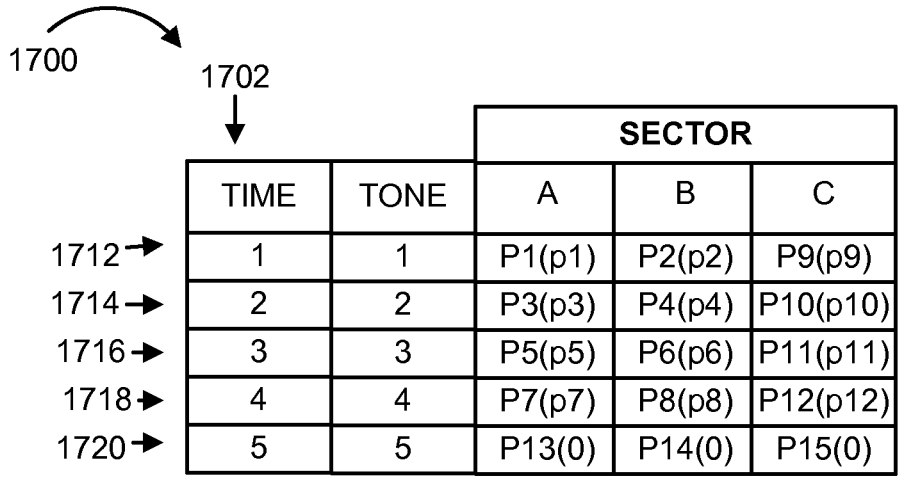

Communications routines 1222 is used for controlling the base station 1200 to perform various communications operations and implement various communications protocols. Base station control routines 1224 used to control the base station 1200 to perform basic base station functionality, e.g., signal generation and reception, scheduling, and to implement the steps of the method of the present invention including generation of pilot signals at different transmission strength levels, reception and processing and use of wireless terminal reported information. The signaling routine 1228 controls the transmitter 1204 and the receiver 1204 which generate and detect signals to and from the wireless terminals, e.g. OFDM signals following data tone hopping sequences. Pilot signal generation and transmission control routine uses the data/information 1220 including the pilot hopping sequence info 1234 to generate a specific pilot tone hopping sequences for each sector. The power levels of the pilot tones, included in power level info 1236 and the specific tones selected to receive specific pilot tones for each pilot in each sector at specific times are coordinated and controlled under the direction of the pilot signal generation and transmission control routine 1230. This routine 1230 controls the transmission of pilot tones, e.g., as illustrated in FIGS. 15-17. Individual processing instructions, e.g., software commands, responsible for the transmission of different pilot tones are individual components or modules which may be interpreted as separate means which operate together to control the base station to transmit the pilot tone sequences described and shown in FIGS. 15-17. Coordinating and/or synchronizing the transmission of various types of pilot signals between the sectors of a cell, e.g., in terms of transmission frequency, and/or symbol transmission time while controlling transmission power, enables a wireless terminal receiving the various levels of transmitted pilot tones, e.g., known predetermined fixed level pilot tones, sector null pilot tones, and cell null pilot tones, to obtain, e.g., compute from measured signal values, channel quality indicator values 1250. In accordance with the invention, regular (non-null) pilot tones, sector null pilot tones, and cell null pilot tones may punch through or replace data tones that would normally be transmitted. Scheduling module 1225 is used to control transmission scheduling and/or communication resource allocation. The scheduler 1225, in accordance with the invention, may be supplied with information indicating each wireless terminal's received SNR as a function of the base station transmitted signal power. Such information, derived from the channel quality indicator values 1250, may be used by the scheduler to allocate channel segments to WTs. This allows the BS 1200 to allocate segments on channels having sufficient transmission power to meet received SNR requirements for a particular data rate, coding scheme, and/or modulation selected to be provided to a WT.

Figure 13:
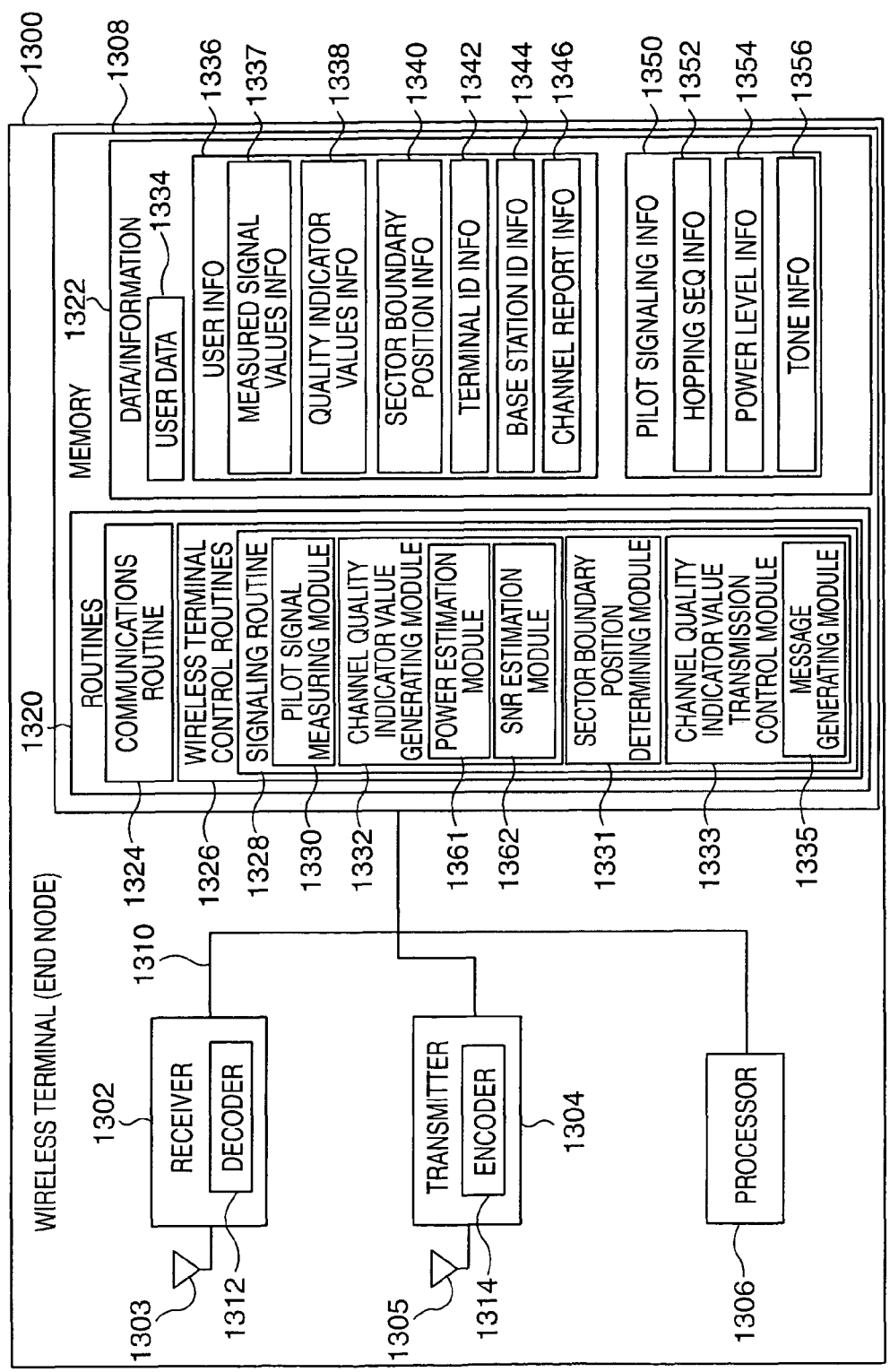
FIG. 13 illustrates an exemplary wireless terminal implemented in accordance with the present invention.

FIG. 13 illustrates an exemplary wireless terminal 1300 implemented in accordance with the present invention. The wireless terminal 1300 may be used as a wireless end node, e.g., a mobile node. Wireless terminal 1300 is a more detailed representation of the ENs 1114, 1116, 1118, 1120, 1122, 1124 shown in the exemplary communications system 1100 of FIG. 11. Wireless terminal 1300 includes a receiver 1302, a transmitter 1304, a processor, e.g., CPU, 1306, and memory 1308 coupled together via a bus 1310 over which the elements may interchange data and information. The wireless terminal 1300 includes receiver and transmitter antennas 1303, 1305 which are coupled to receiver and transmitter 1302, 1304 respectively. The receiver 1302 includes a decoder 1312 while the transmitter 1304 includes an encoder 1314. Processor 1306, under control of one or more routines 1320 stored in memory 1308 causes the wireless terminal 1300 to operate in accordance with the methods of the present invention as described herein. Memory 1308 includes routines 1320 and data/information 1322. Routines 1320 includes communications routine 1324 and wireless terminal control routines 1326. The wireless terminal control routines 1326 includes signaling routine 1328 including a pilot signal measuring module 1330, a channel quality indicator value generating module 1332, a sector boundary position determining module 1331, and a channel quality indicator value transmission control module 1333. Data/information 1322 includes user data 1334, e.g. information to be transmitted from the wireless terminal 1300 to a peer node, user info 1336, and pilot signaling info 1350. User info 1336 includes measured signal values info 1337, quality indicator value information 1338, sector boundary position information 1340, terminal ID information 1342, base station ID information, and channel report information 1346. Pilot signaling info 1350 includes hopping sequence info 1352, power level info 1354, and tone info 1356. The measured signal value info 1337 includes measured signal values obtained from measurements, performed under the control of pilot signal measuring module 1330, of a at least one of an amplitude and phase of a received pilot signal. The quality indicator value information 1338 includes output from the channel quality indicator value generating module 1332. The channel quality indicator value information 1338, when transmitted to a base station may allow the base station to determine the WTs received SNR as a function of transmitted signal power. Sector boundary position information 1340 includes information identifying that the wireless terminal is in a sector boundary region, e.g., the wireless terminal is experiencing high inter-sector interference levels, and information identifying which of the two adjacent sectors is the boundary region sector. The base station may use the sector boundary information to identify channels in adjacent sectors where the transmission power should be turned off to reduce inter-sector interference. Channel report information 1346 includes the quality channel indicator values 1338 obtained or portions of the channel quality indicator values 1338 and may also include sector boundary position information 1340. The channel report information 1346 may be structured with individual messages for each quality indicator value or with groups of quality indicator values included in a single message. The messages may be sent out periodically at predetermined times on dedicated channels. The terminal ID information 1342 represents a base station assigned identification applied to the wireless terminal 1300 while operating within the cellular coverage area of the base station. The base station ID info 1344 includes information specific to the base station, e.g., a slope value in a hopping sequence, and may also include sector identification information.

The pilot hopping sequence information 1352 identifies for a given base station, with base station ID info 1344, which tones 1356 at what time, e.g., OFDM symbol time, should be measured to evaluate pilot signals. The pilot signal power level information 1354 identifies to the wireless terminals, the transmission levels of pilot signals on the assigned pilot signal tones 1356 included in the pilot tone hopping sequence 1352. Pilot signal power level information 1354 may also identify sector and cell null pilot tones.

Communications routines 1324 is used for controlling the wireless terminal 1300 to perform various communications operations and implement various communications protocols.

Wireless terminal control routines 1326 controls the basic functionality of the wireless terminal 1300 in accordance with the methods of the present invention. Wireless terminal signaling routines 1328 control the basic functionality of the wireless terminal signaling including control of the receiver 1302, transmitter 1304, signal generation and reception and controls the operation of the wireless terminal in accordance with the methods of the present invention including the measuring of pilot signals, the generation of quality indicator values, and the transmission of channel quality indicator values. The pilot signal measuring module 1330 controls the measurement of received pilot signals, identified by the base station ID info 1344, hopping sequence info 1352, and tone info 1356. Pilot signal measuring routine 1330 measures at least one of an amplitude and a phase of a pilot signal to produce a measured signal value corresponding to each pilot signal measured. Channel quality indicator value generating module 1332 includes a power estimation module 1361 and a SNR estimation module 1362. Channel quality indicator value generating module 1332 generates quality indicator values according to functions, which use the measured signal values 1337 output from the pilot signal measuring module 1330. Module 1332 includes first and second sets of instructions for implementing first and second channel quality indicator value functions where the first and second functions are different. Power estimation module 1361 includes software instructions for controlling the processor 1306 to estimate the received power included in received pilot signal(s). SNR estimation module 1362 includes software instructions for controlling the processor 1306 to estimate the signal to noise ratio of received pilot signal(s). The sector boundary position determining module 1331 determines the position of the wireless terminal 1300 relative to a sector boundary from information included in received signals. The sector boundary position determining module 1331 may also distinguish which adjacent sector boundary the wireless terminal is closer to and which adjacent sector is causing higher interference levels with respect to WT 1300. The information output from sector boundary position determining module 1131 is included in the sector boundary position information 1340. The channel quality indicator value transmission control routine 1333 controls the transmission of the quality channel value indicator information and sector boundary information to the base station. The channel quality indicator value transmission control routine 1333 includes a message generation module 1335. Message generation module 1335 controls the processor 1306 using machine executable instructions to generate messages used to communicate channel quality indicator values. Message generation module 1335 may generate messages with a single channel quality indicator value or include at least two channel quality indicator values in a single message. Message generation module 1335 may also generate messages, which include position information, e.g., sector boundary position information 1340 or incorporate such information into a message which includes a channel quality indicator value. The messages, generated by message generation module 1335 are transmitted under control of the channel quality indicator value transmission control module 1333. Messages corresponding to first and second values may be interleaved, e.g., alternated for transmission purposes. Channel quality indicator value transmission control module 1333 transmits messages periodically in some embodiments using communication channel segments dedicated to carrying channel quality indicator values. Module 1333 may also control the transmission times to correspond to pre-selected dedicated time slots dedicated by the base station for use by a WT 1300 thereby precluding other wireless terminals from using the dedicated time slots.

Figure 1:
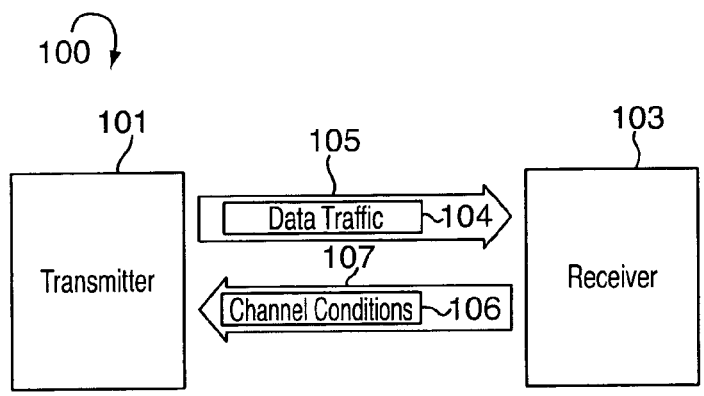
FIG. 1 is a simplified diagram showing a transmitter and a receiver used for explaining the present invention.

FIG. 1 is a simplified diagram showing a transmitter 101 and a receiver 103 which will be used for explaining the invention. Transmitter 101 may be, e.g., the transmitter 1204 of base station 1200, while receiver 103 may be, e.g., the receiver 1302 of wireless terminal 1300. In a communications system, such as the system 1100, the transmitter 101 often needs to make choices about the appropriate method for transmitting data to the receiver 103. The choices may include the code rate of the error-correcting code, the modulation constellation, and the transmit power level. In general, in order to make sensible choices, it is desirable for the transmitter 101 to have knowledge about the communication channel from the transmitter 101 to the receiver 103. FIG. 1 shows an exemplary system 100, in which a transmitter 101 sends data traffic 104 to a receiver 103 on a forward link 105. On a reverse link 107 from the receiver 103 to the transmitter 101, the receiver 103 reports the forward link's channel condition 106 to the transmitter 101. The transmitter 101 then uses the reported channel condition information 106 to set its parameters properly for transmission.

Figure 2:
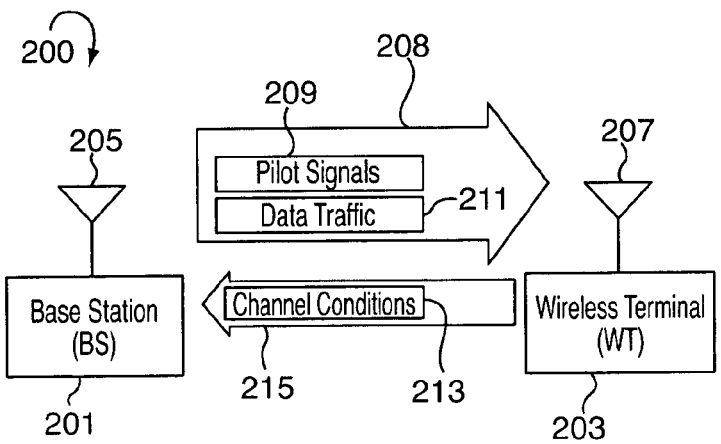
FIG. 2 shows an exemplary wireless cellular system.

FIG. 2 shows an exemplary wireless cellular system 200 where a transmitter is included in a base station (BS) 201 with antenna 205 and a receiver is included in a wireless terminal (WT), 203, e.g., a mobile terminal or a fixed terminal, with antenna 207, enabling the base station 201 to communicate information on the downlink channel(s) 208 to the wireless terminal 203. The BS 201 often transmits pilot signals 209, which are typically transmitted on a small fraction of the transmission resource and are generally comprised of known (pre-determined) symbols transmitted at a constant power. The WT 203 measures the downlink channel condition 213 based on the received pilot signals 209, and reports the channel conditions 213 to the BS 201 on an uplink channel 215. Note that since the channel conditions 213 often change over time due to fading and Doppler effects, it is desirable that the BS 201 transmit the pilots 209 frequently or even continuously so that the WT 203 can track and report channel conditions 213 as they vary with time. The WT 203 can evaluate the downlink channel conditions 213 based on the received signal strength and the noise and interference on the pilot signals 209. The combination of noise and interference will be referred to subsequently as 'noise/interference' or sometimes just 'noise'. In the prior art techniques, this type of information is normally reported in the form of a single scalar ratio such as signal-to-noise ratio (SNR) or an equivalent metric. In the case where noise/interference is not dependent on the transmitted signal, such a single scalar metric is usually all that is required at the BS 201 to predict how the received SNR will change with signal transmit power. In such a case, the BS 201 can determine the correct (minimum) transmit power for the coding and modulation it selects to transmit from the single received value. Unfortunately, in the multi-sector case, noise resulting from transmitted signals can be a significant signal component making a single scalar value insufficient for accurate SNR predictions for different transmission power levels.

Figure 3:
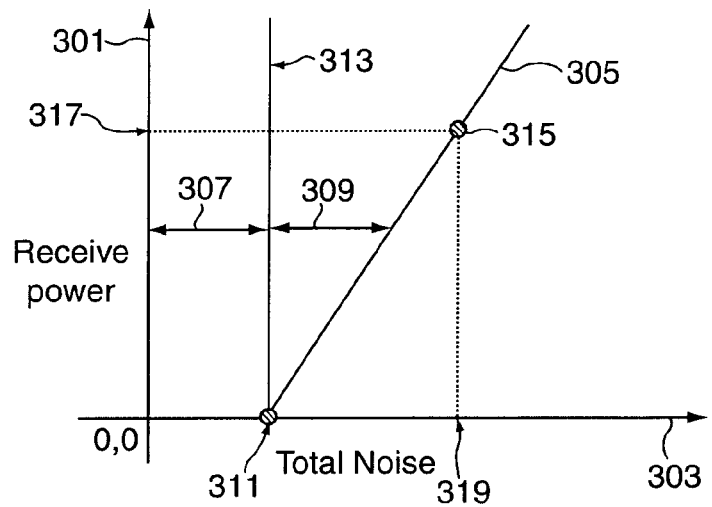
FIG. 3 shows an example where noise is dependent on transmitted signal power and is used for explaining the present invention.

In many communication situations, especially in cellular wireless systems, such as the multi-sector system 1100 of the invention, the noise is not independent of the signal transmit power but depends on it. There is generally a component of noise called 'self-noise', which is proportional or roughly proportional to the power of the signal. FIG. 3, shows an example where noise is dependent on signal transmit power. In FIG. 3, graph 300 shows received power of the signal of interest on the vertical axis 301 vs total noise on the horizontal axis 303. Total noise, represented by line 305 which is the sum of a signal dependent portion 309 and a signal independent portion 307, is plotted against the received signal power 317. There may be many reasons for the self-noise. An example of self-noise is the unequalized signal energy that interferes with the received signal. This noise is proportional to the signal strength. The unequalized signal energy could result from error in channel estimation or error in the equalizer coefficients or from many other reasons. In situations where the self-noise is comparable to or larger than the signal-independent noise, a single scalar downlink SNR value (which may be measured on a pilot) is no longer adequate for the BS 1200 to accurately predict the received SNR at the WT 1300 as a function of the signal transmit power.

This invention provides a methods and apparatus which enable each WT 1300 to predict its downlink receive SNR as a function of the signal transmit power in the presence of signal dependent noise 309 and communicate this information to the BS 1200. This enables the BS 1200 to transmit to different WTs at different (minimum) signal powers depending upon the respective SNRs required at each of the WTs. The total power transmitted by the BS 1200 is typically known or fixed but the proportion allocated to different WTs 1300 may be different and may vary over time. At a WT receiver 1302, the dependence of total noise 303 as a function of the received signal power 317 can be modeled by a straight line 305, referred to as the 'noise characteristic line' in this application, as shown in FIG. 3. Since the noise characteristic line 305 does not in general go through the origin, a single scalar parameter is not enough to characterize this line 305. At least two parameters, e.g., two channel quality indicator values, are required to determine this line 305. A simple method of determining this line is to identify the location of two distinct points, e.g., points 311 and 315, on it, since any two distinct points uniquely determine a straight line. Note that as a practical matter, the points can be determined with a limited accuracy, so that the accuracy with which the line is determined is better if the points are chosen farther apart than if the points are closer together.

The base station 1200 transmits pilot signals on the downlink. In accordance with the invention, by transmitting pilot signals of different strength levels, the noise characteristic line for the wireless terminal can be determined. In general a first pilot signal is transmitted at a first power level to obtain a first point, and a second pilot signal at a second power level, different from the first power level, is transmitted to obtain a second data point. The first and second pilots can be transmitted at the same time if different tones are used for each pilot signal.

With respect to FIG. 3, the first pilot signal is measured and processed to produce the first point 315 on line 305 identifying received pilot power level 317 and a corresponding total noise level 319. In accordance with an embodiment of the invention, the BS 1200 transmits 'null pilot' signals on the downlink in addition to non-zero pilots. The null pilots are comprised of transmission resources (degrees of freedom) where the BS 1200 transmits no signal power, e.g., transmits a pilot signal having zero power. The second pilot signal, the null pilot signal, results in point 311 on line 305 and identifies null pilot noise level 313 which is equivalent to the signal independent noise 307. Based on the noise measured on both, the pilots and the null pilots the WT 1300 obtains two different noise estimates 313, 315 at two different signal powers, e.g., 0 power and received pilot power 317. From these two points 311, 315, the WT 1300 can determine the entire noise characteristic line 305 of FIG. 3. The WT 1300 can then also communicate the parameters of this line 305 (for example, slope and intercept, or some other equivalent set of information) to the BS 1200 enabling the BS 1200 to determine the received SNR for a given transmit signal power when transmitting to the WT 1300 which reported multiple channel quality values. Since null pilots have zero signal power and other pilots, on the other hand, are usually transmitted at a relatively large power, the two points 311, 315 corresponding to the null pilot and the non-zero pilot in FIG. 3 are relatively far apart leading to a good accuracy in characterizing the line 305.

Figure 4:
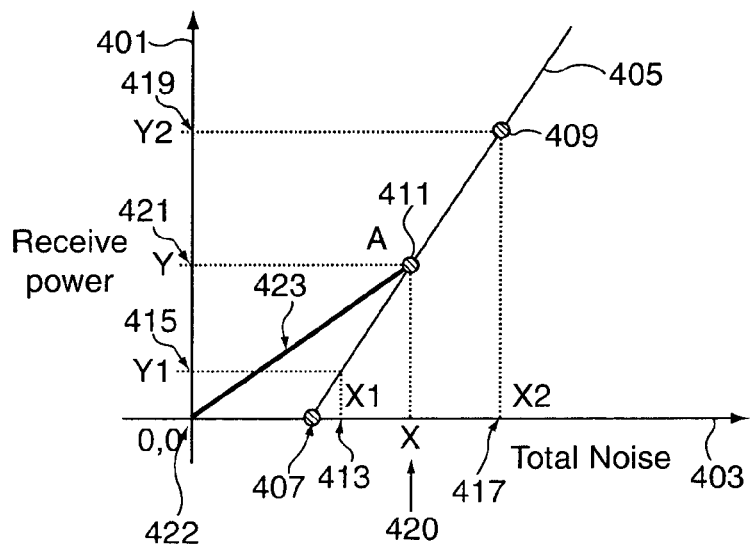
FIG. 4 shows an example of an exemplary noise characteristic line, showing received power vs total noise, and is used for explaining the present invention.

Signal noise and various signaling issues will now be discussed further. Graph 400 of FIG. 4 plots received power of a signal of interest on the vertical axis 401 vs total noise on the horizontal axis 403. FIG. 4 gives an illustration of an exemplary noise characteristic line 405. To characterize the line 405, in accordance with the invention, the BS 1200 transmits signals that enable the WT 1300 to make measurements of at least two distinct points on the line, e.g. points 407 and 409, information, characterizing the line 405, obtained from those measurements is then transmitted to the BS 1200. For example, the BS 1200 can transmit two different signal powers P1 and P2 that will be received as powers Y1 and Y2 as shown in FIG. 4. The WT 1300 measures the corresponding received signal powers, denoted as Y1 415 and Y2 419, and the corresponding total noise, denoted as X1 413 and X2 417, respectively. From X1 413, X2 417, Y1 415, and Y2 419, the slope and the intercept of the line 405 can be uniquely determined. In one embodiment, P1 and P2 are known and fixed. In another embodiment, P2 can be the pilot power, corresponding to a pilot signal, while P1 can be zero, representing a null signal, which occupies some transmission resource but with zero transmission power. In general, however, P1 does not necessarily have to be zero. For example, P1 can and in some embodiments is some positive number smaller than P2.

Once the noise characteristic line 405 has been determined by the BS 1200 from received feedback information, the BS 1200 can calculate the SNR at the WT receiver 1302 for any given transmission power Q. For example, FIG. 4 shows the procedure of determining the SNR corresponding to a given transmission power Q. First, the BS 1200 finds the corresponding received signal power Y 421 of transmission power Q, by linearly interpolating between the points (Y2, P2) and (Y1, P1):

$$Y = Y1 + \frac{Y2 - Y1}{P2 - P1} \cdot (Q - P1).$$

The corresponding noise power corresponding to a transmission power Q is given by linearly interpolating between the points (X2, P2) and (X1, P1):

$$X = X1 + \frac{X2 - X1}{P2 - P1} \cdot (Q - P1)$$

Then SNR(Q), the SNR as seen by the WT 1300 for a BS transmit power Q, is given by:

$$SNR(Q) = \frac{Y}{X} = \frac{Y1(P2 - P1) + (Y2 - Y1)(Q - P1)}{X1(P2 - P1) + (X2 - X1)(Q - P1)}$$

Point A 411 on the noise characteristic line 405 shown in FIG. 4 has the x-axis value of X 420 and y-axis value of Y 421 and corresponds to transmission power Q. Note the slope of a line that connects point A 411 and the origin 422 is SNR(Q), the SNR at the WT receiver 1302 if transmit power Q is used. Therefore, from the noise characteristic line 405 generated from the reported statistics from the WT 1300, the BS 1200 can and does determine, for example, what transmission power is required to meet a given SNR requirement for the WT 1300.

Figure 5:
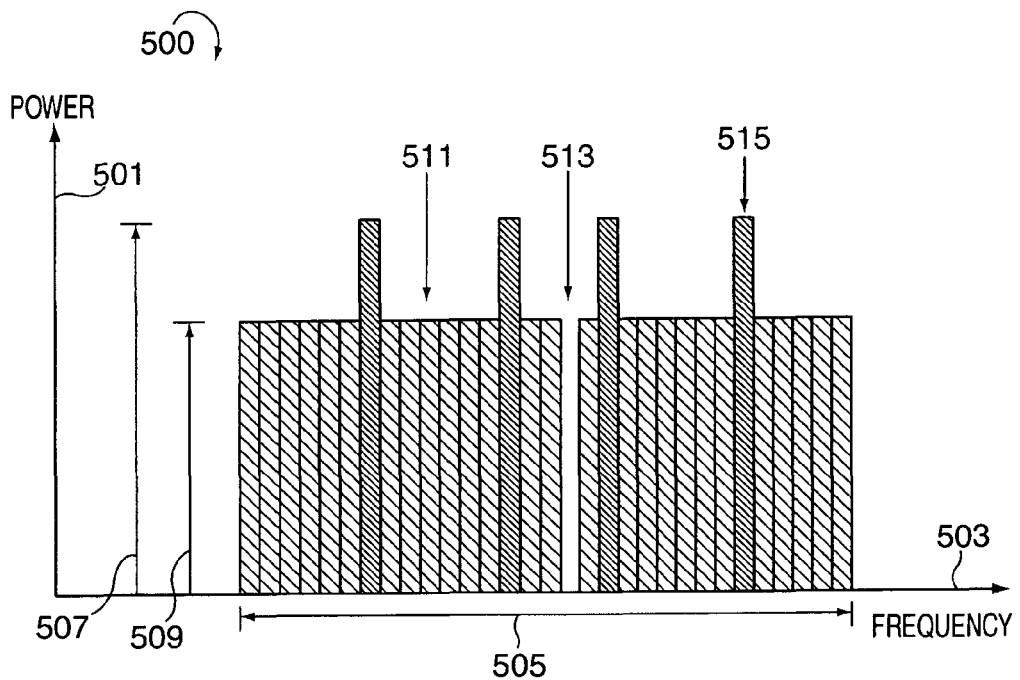
FIG. 5 shows a graph of power vs frequency corresponding to an exemplary embodiment of the invention illustrating data tones, non-zero pilot tones, and a null pilot tone.

FIG. 5 shows a graph 500 plotting power on the vertical axis 501 vs frequency on the horizontal axis 503. FIG. 5 corresponds to one exemplary embodiment of this invention, in which the wireless cellular network uses Orthogonal Frequency Division Modulation (OFDM). In this exemplary case, the frequency 505 is divided into 31 orthogonal tones, such that transmissions on different tones do not interfere with each other at the receiver, even in the presence of multipath fading in the channel. The minimum unit of signal transmission is a single tone in an OFDM symbol, which corresponds to a combination of time and frequency resources.

FIG. 5 shows the power profile of the tones at a given OFDM symbol. In this embodiment, a pilot 515 is a known symbol sent at a fixed pilot power 507 on a tone, and the null pilot 513 is a tone with zero transmission power. These pilot tones 515 and null pilot tones 513 may hop over time, meaning that from one OFDM symbol to the next, the position that they occupy may vary. Over extended periods of time, the pilot signal transmissions are periodic due to the repetition of the hopping sequences. Four pilot tones 515 and one null pilot tone 513 are shown in FIG. 5. The tone locations of the pilots 515 and the null pilots 513 are known to both the BS 1200 and the WT 1300. Twenty-six data tones 511 are also shown in FIG. 5 with corresponding transmission power level 509. FIG. 5 illustrates that the pilot tone transmission power level 515 is significantly higher than the data tone transmission power level 509, allowing the wireless terminals to easily recognize pilot tones. In general, the data tone transmission power 509 may not necessarily be the same across all the data tones as shown in FIG. 5, but level 509 may vary from data tone to data tone.

In the situation of a wireless deployment situation deployed with omni-directional antennas, the embodiment specifies a single null pilot known as the cell null pilot. Suppose that a pilot tone is transmitted at power P, and a tone carrying data traffic 211 is transmitted at power Q, as indicated in FIG. 5. By looking at the received signal for the pilot, the WT 1300 is able to measure the SNR, which we refer to as SNR(P). The goal is for the base station 1200 to be able to obtain an estimate of SNR(Q), which is the SNR as seen by the wireless terminal 1300 corresponding to the base station's transmission of data at power Q, which may be different from P.

The knowledge of the received SNR is important since it determines the combination of coding rates and modulation constellations that can be supported. For a specified target block error rate (e. g., the probability that the transmission of a single codeword is incorrect) and for each coding rate and modulation constellation, it is possible to define a minimum SNR that the received SNR must exceed in order for the probability of unsuccessful transmission to be less than the specified target rate (e.g., 1% block error rate). From this point of view, it is desirable for the BS 1200 be able to accurately estimate SNR(Q) in order to solve for the transmit power Q that will produce an SNR that exceeds the minimum SNR for the desired code rate and modulation constellation.

The relationship between SNR(Q) and Q depends on the signal-dependent noise. For the sake of description, we assume that the signal-dependent noise is proportional to the transmit power and use the noise characteristic line 305, 405 as shown in FIGS. 3 and 4 to characterize the dependence of the total noise as a function of the received signal power. The principle can similarly be extended to other situations.

Let $\alpha$ denote the channel gain, so that when the BS transmits at power P, the received power by wireless terminal is $\alpha P$. Let N denote the signal-independent noise, and $\gamma P$ represent the signal-dependent noise, where $\gamma$ is the proportionality factor to the transmit power P. Then when measuring the SNR on pilot tones, the WT 1300 measures an SNR of $$SNR1(P) = \frac{\alpha P}{N + \gamma P},$$

where P is the constant transmit power of the pilots and N is the signal-independent noise seen by the WT 1300. We call this 'SNR1' to indicate that it treats the signal-dependent interference as a single entity.

By using the null pilot, it is possible for the WT 1300 to separately measure the signal-independent noise N, since there is no power transmitted by the BS 1200 on this null tone. By comparing this signal-independent noise N with the received power $\alpha P$ of the BS pilot, it is possible to estimate an SNR that is free of signal-dependent noise. Let us represent this ratio by $$SNR0(P) = \frac{\alpha P}{N},$$

where the name 'SNR0' indicates that it considers no signal-dependent noise. Then the relationship between SNR1(P) and SNR0(P) is given by:

$$\frac{1}{SNR1(P)} = \frac{1}{SNR0(P)} + \frac{\gamma}{\alpha}.$$

For notational simplicity, let us define $$SRR1 = \frac{\gamma}{\alpha}.$$

Comparing with the noise characteristic line shown in FIGS. 3 and 4, one can see that SNR0(P) corresponds to the x-axis intercept of the line, while SRR1 is equivalent to the slope of the line. Then as a function of SNR0(P) and SRR1, we can write:

$$SRR1(P) = \frac{SNR0(P)}{SRR1 \cdot SNR0(P) + 1}.$$

In an embodiment, the measurements SNR0(P) and the SRR1 are reported by the WT 1300 to the BS 1200. From these reports, the BS 1200 can compute SNR1(P).

Figure 6:
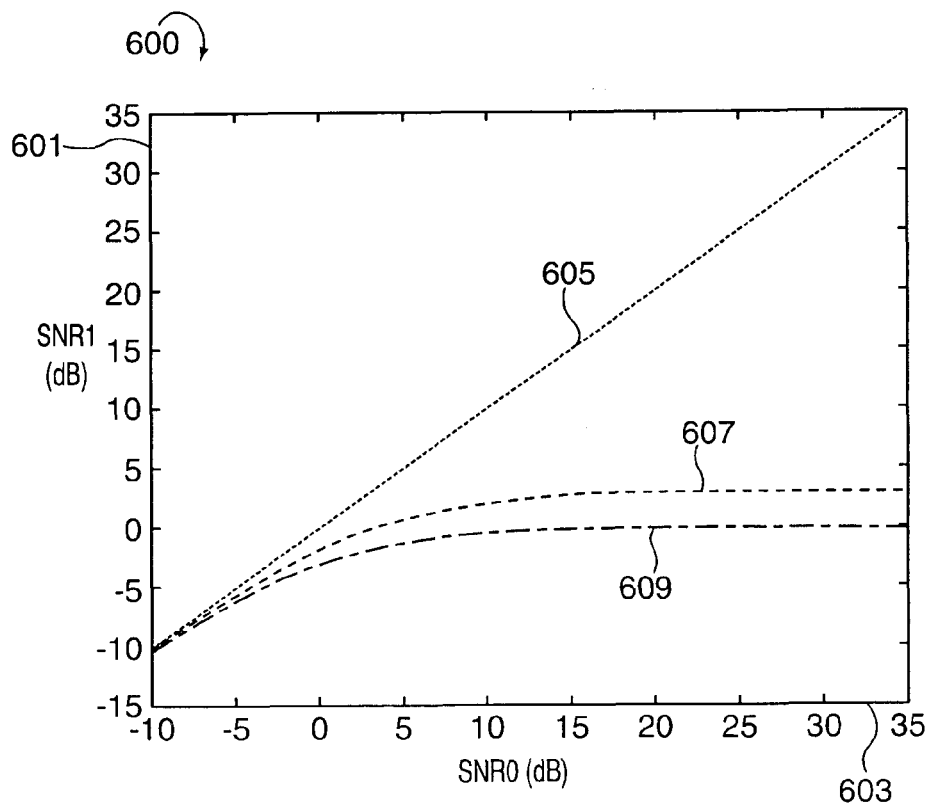
FIG. 6 is a graph illustrating the relationship between SNR1, a wireless terminal received SNR including signal dependent and signal independent noise, and SNR0, a wireless terminals received SNR including no signal dependent noise for 3 cases: where noise is independent of the signal, where the signal dependent noise is equal to the signal, and where the signal dependent noise is less than the signal.

Graph 600 of FIG. 6 illustrates the relationship between SNR1(P) on the vertical axis 601 and SNR0(P) on the horizontal axis 603, where the SNRs are plotted in dB. Three curves illustrates by lines 605, 607, and 609 representing SRR1=0, SRR1=0.5 and SRR1=1, respectively. The case of SRR1=0 (line 605) corresponds to the situation where noise is independent of the signal, so that SNR1(P)=SNR0(P). The case of SRR1=1 (line 609) corresponds to the case where the signal-dependent noise is equal to the signal so that it is never possible for SNR1(P) to exceed 0 dB.

From the information received from the WT 1300, the BS 1200 can then compute the received SNR as a function of the transmit power Q for the data traffic. The received SNR by the WT 1300 will include signal-dependent noise, and takes the form $$SNR1(Q) = \frac{\alpha Q}{N + \gamma Q}.$$

Inverting and performing substitutions gives:

$$\frac{1}{SNR1(Q)} = \frac{N}{\alpha Q} + \frac{\gamma}{\alpha} = \frac{1}{SNR0(P)} \frac{P}{Q} + SRR1$$

$$SNR1(Q) = \frac{SNR0(P)}{SNR0(P) \cdot SRR1 + \frac{P}{Q}}$$

Hence as a function of the values SNR0(P) and SRR1 reported by the WT 1300, it is possible to predict the SNR as seen by the WT 1300 for any transmit power Q. These derivations illustrate that using the null pilot, the WT 1300 can determine and transmit statistics to the BS 1200 which enable the BS 1200 to predict SNR as a function of transmit power in the presence of signal-dependent noise that is proportional to the transmit power.

Note that rather than sending SNR0(P) and SRR1, there are other equivalent sets of reports that the WT 1300 can send to the BS 1200, which fall within the scope of the invention.

The methods and apparatus of the present invention are particularly useful in a multi-sector cell. In wireless cellular systems, base stations 1200 are often deployed in a configuration where each cell is divided into multiple sectors as shown in FIG. 11. For a sectorized environment, the interference between sectors 1106, 1108, 1110 has a significant impact on the received SNR. In addition to the signal-independent portion, the total noise also includes signal-dependent portions, each of which is proportional to the signal power from other sectors of the same cell 1104. The noise characteristics in this case are more complex than what is shown in FIG. 3, because in this sectorized situation, the total noise includes two or more signal-dependent components instead of one. However, the total noise can still be characterized by a straight line, which is now defined in a higher dimensional space. This noise characteristic line can be described, for example, by an intercept and slopes. The intercept is a function of the signal-independent noise portion and each slope corresponds to the proportionality of the signal-dependent noise portion with respect to a particular signal power.

In certain scenarios, however, the description of the noise characteristic line can be simplified. For example, in an exemplary method of sectorization, where each of the sectors of a cell may use the entire or nearly the entire transmission resource, e.g., frequency band, to transmit in each of the sectors. The total power transmitted from each sector is typically fixed or known but different WTs 1300 may receive a different fraction of it. Since the isolation between the sectors is not perfect, signal transmitted on one sector becomes noise (interference) to other sectors. Furthermore, if each of the sectors 1106, 1108, 1110 is constrained to transmit identical, proportional or nearly proportional signal power on a given degree of freedom, the interference from other sectors to a WT 1300 in a given sector 1106, 1108, 1110 appears like signal dependent noise or self-noise. This is the case because the interference from other sectors scales with signal power, so that the noise characteristic line is similar to what is shown in FIG. 3.

In accordance with the invention, the BS 1200 transmits signals such as the 'cell null pilot' that enable the WT 1300 to evaluate the intercept of the noise characteristic line with all of the signal-independent noise. In addition, as an example, the scheduling amongst the sectors 1106, 1108, 1110 may be coordinated so that WTs 1300 at the boundary 1150, 1152, 1154 of sectors do not receive any interference (or receive reduced interference) from other sectors. In accordance with the invention, the BS 1200 transmits signals such as the 'sector null pilot' that enable the WT 1300 to evaluate the slope of the noise characteristic line taking into account only the signal-dependent noise from a subset of sectors. In accordance with the invention, the WT 1300 then reports the signal-independent SNR and these different slopes, or some equivalent set of information, back to the BS 1200 on a reverse link.

Figure 7:
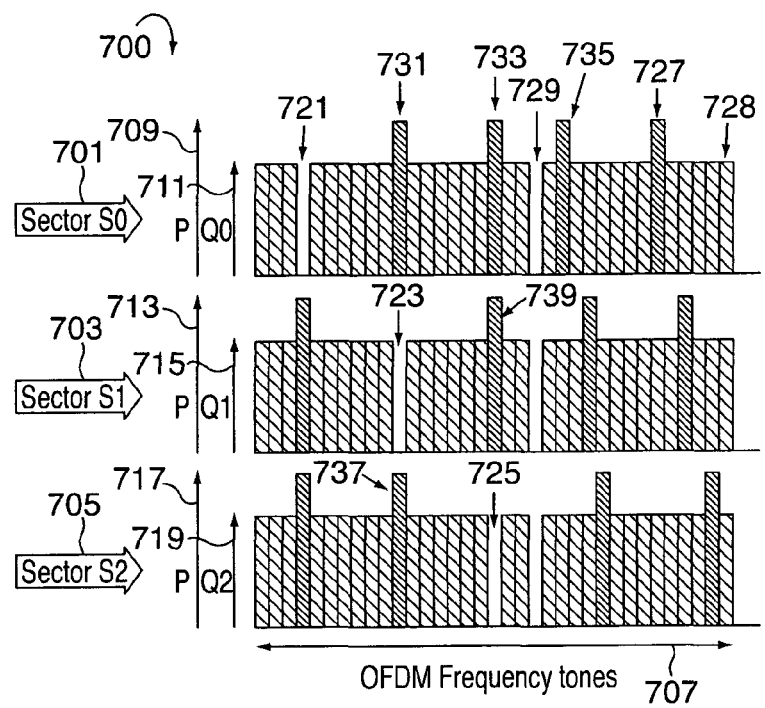
FIG. 7 shows exemplary signaling for a three sector OFDM embodiment of the invention illustrating non-zero pilot tones, sector null pilot tones, and cell null pilot tones in accordance with the invention.

FIG. 7 shows in diagram 700 the signaling for an embodiment of the invention in the case of a sectorized cellular wireless system using Orthogonal Frequency Division Modulation (OFDM). Consider a BS 1200 with three sectors 701, 703, 705, in which the same carrier frequency is reused in all sectors 701, 703, 705. The pilot power level corresponding to sectors 701, 703, 705 are indicated by reference numbers 709, 713 and 717, respectively. Data signal power levels are indicated by reference numbers 711, 715, 719 for each of the first through third sectors, respectively. The situation of other numbers of sectors will be discussed below. Let the three sectors 1106, 1108, 1110 of the base station 1200 be represented by S0 701, S1 703, and S2 705 as shown in FIG. 7. FIG. 7 shows a tone allocation for the downlink transmission at a given OFDM symbol 707, including an example of the placement of data tones, e.g. exemplary data tone 728, pilot tones, e.g. exemplary pilot tone 727, and null pilot tones, e.g. exemplary null pilot tone 721, across the three sectors. Since it is assumed that each of the sectors share the same frequency band, the corresponding tones between sectors will interfere with each other. Note that the position and order of the tones are shown for illustrative purposes only and may vary in different implementations.

In accordance with the invention, the downlink signal includes one or more cell null pilots, which are null tones that are shared by each of the sectors 701, 703, 705. In a cell null pilot 729, there is zero transmission power in each of the sectors 701, 703, 705. In addition, the downlink signal includes one or more sector nulls 721, 723, 725 where the transmission power is zero only in a subset of the sectors 701, 703, 705. In the same tone as the sector null pilot, it is desirable to have a pilot tone or a data tone whose transmission power is fixed and known to the WT 1300 in the other sectors. For example, sector S1 703 sector null pilot 723, has corresponding sector S0 701 pilot tone 731 and corresponding sector S2 705 pilot tone 737.

In one embodiment shown in FIG. 7, there are 4 pilots, 1 sector null pilot and 1 cell null pilot in each sector 701, 703, 705. For example, sector S0 701 has four pilots 731, 733, 735, 737, one sector null pilot 721, and one cell null pilot 729. These pilots are arranged such that each sector has two unique pilots, and then shares a pilot with each of the two other sectors. For example, sector S0 701 has unique pilots 735, 727; pilot 731 shares a tone frequency with pilot 737 of sector S2 705; pilot 733 shares a tone frequency with pilot 739 of sector S1 703. In addition, the sector null pilot for one sector coincides with pilot tones in the other sectors. For example, for the null tone 725 in sector S2 705, a pilot 733, 739 is transmitted on the same tone in sectors S0 701 and SI 703, respectively. The locations of the pilot tones, the cell null tones and the sector null tones are known to both the BS 1200 and the WT 1300.

Figure 8:
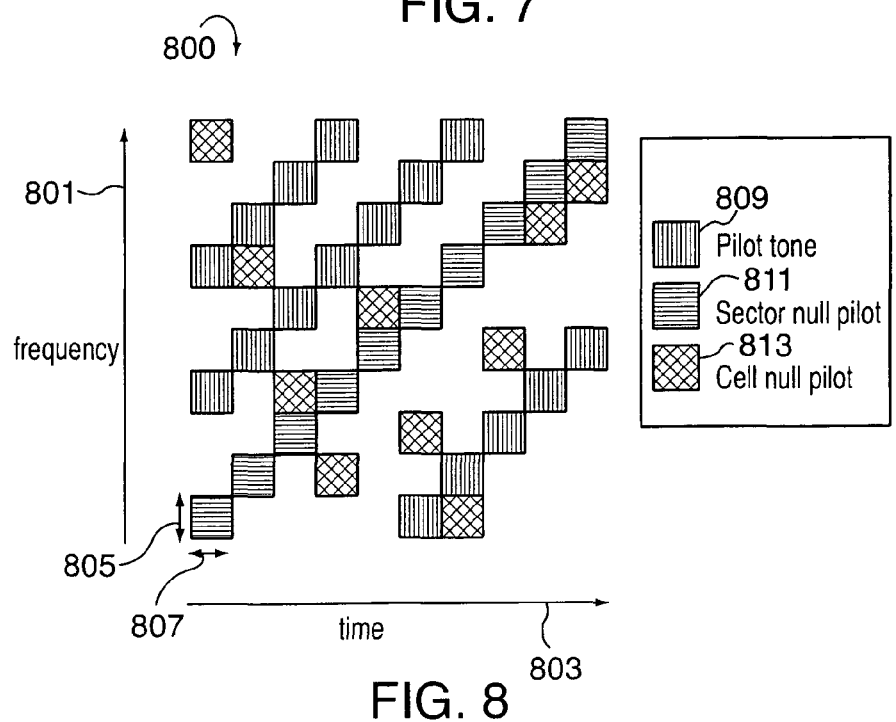
FIG. 8 illustrates an example of tone hopping of the non-zero pilots, sector null pilot, and cell null pilots in accordance with the invention.

The pilots change their positions, or 'hop,' over time for various reasons such as frequency diversity. FIG. 8 gives an example of the tone hopping of the pilots, cell null pilots, and sector null pilots. Graph 800 of FIG. 8 plots frequency on the vertical axis 801 vs time on the horizontal axis 803. Each small vertical subdivision 805 corresponds to a tone, which each small horizontal subdivision 807 corresponds to an OFDM symbol time. Each pilot tone 809 is represented by a small box with vertical shading. Each sector null pilot 811 is represented by a small box with horizontal line shading. Each cell null pilot 813 is represented by a small box with cross hatched shading.

In an embodiment, the pilot tones essentially hop following a modular linear hopping pattern. In accordance with the invention, the sector null tones hop following the same modular linear pattern as the pilot hopping with the same slope value. Moreover, in one embodiment of the invention, the cell null pilot tones also hop following the same modular linear pattern as the pilot hopping with the same slope value.

In an embodiment, the data tones essentially hop following a permuted modular linear hopping pattern. In another embodiment of the invention, the cell null pilots hop following the same permuted modular linear pattern as the data hopping. In that embodiment, when a cell null pilot tone collides with a pilot tone, either the transmission of the pilot tone in each of the sectors is suspended and the pilot tone is effectively erased, or the transmission of the pilot tone continues in at least some of the sectors and the cell null pilot tone is effectively rendered unusable.

Suppose that the WT 1300 has a link established with sector S0 of the base station 1200, and that the channel gain from S0 to WT 1300 is given by α. Similarly, suppose that the channel gain from S1 to WT 1300 is given by β, and from S2 to WT 1300 is given by γ. Finally for completeness, suppose that the signal-dependent noise in the link from S0 to WT 1300 includes self-noise that is proportional to the transmit power with a channel gain of δ.

Suppose that the transmit power for the data tones on the three sectors is given by Q0, Q1, and Q2, respectively. Then the received SNR for the link from S0 to WT 1300 is given by $$SNR_{S0}(Q0, Q1, Q2) = \frac{\alpha Q0}{\delta Q0 + \beta Q1 + \gamma Q2 + N}.$$

For the remainder of this discussion, it will be assumed that the interference due to the other sectors (βQ1 and γQ2) is much more significant than the signal-dependent noise from the same sector δQ0, so that for simplicity this term will be omitted in the subsequent discussion.

The WT 1300 should provide a set of parameters to the base station so that it has enough information to predict the received SNR for the downlink data transmission from S0 to WT 1300. To obtain that information, it may use the null pilot tones. Using a cell null pilot, in which the transmission in each of the sectors is 0, it is possible to measure the signal-independent noise. Comparing that with the received strength of the pilot from S0 gives the following SNR:

$$SNR0(P) = \frac{\alpha P}{N}$$

Next, the sector null pilot tones can be, and in various embodiments are, used to measure the SNR in the situation when one of the neighboring sectors is not transmitting. In particular, for sector S0, consider the pilot tone that corresponds to a sector null pilot tone in S2. Then measuring the SNR based on this pilot in sector S0 will give the value $$SNR1^{\beta}(P) = \frac{\alpha P}{\beta P + N},$$

where the interfering sector is S1 (with path gain β). Similarly, by measuring the SNR on the pilot tone that is a sector null tone in S1, the interfering sector is sector S2 (with path gain γ), and the resulting SNR is given by $$SNR1^{\gamma}(P) = \frac{\alpha P}{\gamma P + N}.$$

The slopes of the noise characteristic line in these two cases are β/α and γ/α, respectively.

Next, if the SNR is directly measured using pilot tones that do not correspond to sector null pilots in the other sectors, then this SNR measurement takes into account the interference from the other two sectors. This measurement is called SNR2, since it includes interference from two sectors.

$$SNR2(P) = \frac{\alpha P}{\beta P + \gamma P + N}$$

The slope of the noise characteristic line in this case is $$\frac{\beta + \gamma}{\alpha}.$$

By defining the following SRR as proper slope values of the noise characteristic lines, it is possible to relate $SNR1^{\beta}$(P), $SNR1^{\gamma}$ (P), and SNR2(P) to SNR0(P):

$$SRR2 = \frac{\beta + \gamma}{\alpha}$$

$$SRR1^{\beta} = \frac{\beta}{\alpha}$$

$$SRR1^{\gamma} = \frac{\gamma}{\alpha}$$

The SRRs themselves can be computed in terms of the SNRs as follows:

$$SRR2 = \frac{1}{SNR2(P)} - \frac{1}{SNR0(P)}$$

$$SRR1^{\beta} = \frac{1}{SNR1^{\beta}(P)} - \frac{1}{SNR0(P)}$$

-continued $$SRR1^\gamma = \frac{1}{SNR1^\gamma(P)} - \frac{1}{SNR0(P)}$$

Note that SRR2 can be found as the sum of SRR1$^\beta$ and SRR1$^\gamma$.
Then the SNRs can be written in terms of SNR0(P) and the SRRs:

$$SNR2(P) = \frac{SNR0(P)}{1 + SRR2 \cdot SNR0(P)}$$

$$SNR1^\gamma(P) = \frac{SNR0(P)}{1 + SRR1^\gamma \cdot SNR0(P)}$$

$$SNR1^\beta(P) = \frac{SNR0(P)}{1 + SRR1^\beta \cdot SNR0(P)}$$

If the WT 1300 reports a sufficient set of these statistics (e.g., SNR0(P), SRR1$^\beta$, SRR1$^\gamma$, SRR2) to the base station 1200, the base station 1200 can predict the received SNR by the WT 1300 based on the transmit powers Q0, Q1, and Q2. In general, the SNR as seen by the WT 1300 for a data transmission with power Q0, with interference from sectors S1 and S2 with powers Q1 and Q2, is given in terms of the measurements made on the pilot tone with transmit power P as:

$$SNR_{S0}(Q0, Q1, Q2) = \frac{\alpha Q0}{\beta Q1 + \gamma Q2 + N}$$

$$= \frac{SNR0(P)}{\left(\frac{Q1}{Q0}SRR1^\beta + \frac{Q2}{Q0}SRR1^\gamma\right) \cdot SNR0(P) + \frac{P}{Q0}}$$

Figure 9:
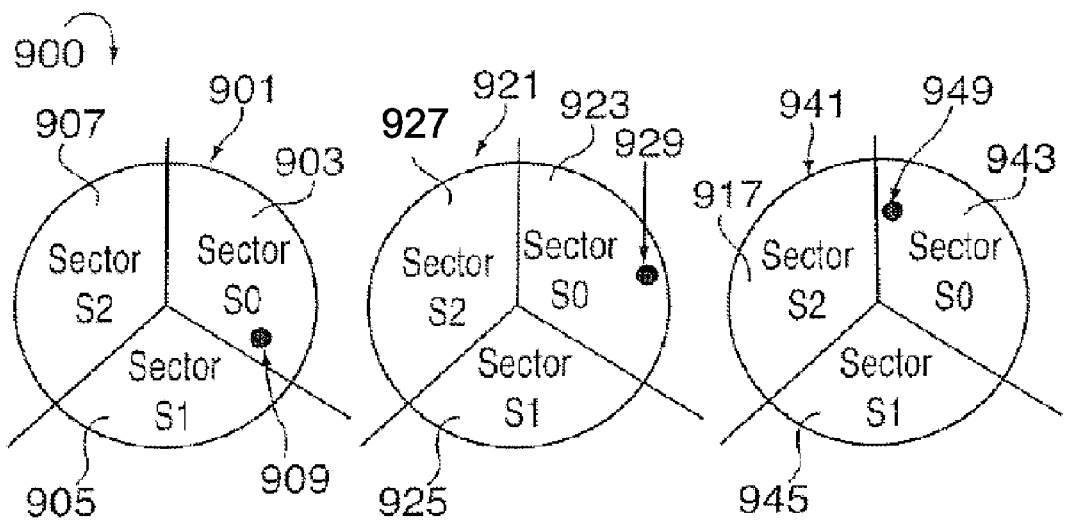
FIG. 9 illustrates three situations for an exemplary wireless terminal in a 3 sector embodiment used to explain the present invention in regard to the sector boundary information aspects of the present invention.

In FIG. 9, diagram 900 shows three situations for an exemplary WT in sector S0. Cell 901 includes three sectors S0 903, S1 905, and S2 907. FIG. 9 shows a WT 909 near the boundary with sector S1 905, where WT 909 receives significant downlink interference from sector S1 905. Cell 921 including three sectors S0 923, S1 925, and S2 927 shows a WT 929 in the center of the sector S0 923, away from the sector boundaries. Cell 941 including three sectors S0 943, S1 945, and S2 947 shows a WT 949 near the boundary with sector S2 941, where the WT 949 receives significant downlink interference from sector S2 947.

In an embodiment of the invention, for each of these three situations, the WT sends a subset of the measured statistics to the BS 1200, in order to reduce the amount of information conveyed on the reverse link, e.g., the uplink.

In the situation shown in FIG. 9 with respect to cell 901, suppose that the WT 909 in sector S0 903 receives significant interference from sector S1 905. Then a coordinated scheduler 1225 for the base station can turn off the data transmissions in sector S1 905 that interfere with the transmissions from sector S0 903 to the WT 909. Meanwhile, the transmission in sector S2 907 is coordinated so that it has the same or nearly the same transmit power Q as in sector S0. Then the SNR seen by the WT 909 will be given by $$SNR_{S0}(Q, 0, Q) = \frac{\alpha Q}{\gamma Q + N}$$

$$= \frac{SNR0(P)}{SRR1^\gamma \cdot SNR0(P) + \frac{P}{Q}}$$

in which case it is sufficient to report SNR0(P) and SRR1$^\gamma$.

Next, for the situation shown in FIG. 9 with respect to cell 921, in which the WT 929 is not near a sector boundary, it is possible to transmit on most or all sectors without causing too much interference to the WT 929. In this case, suppose the base station scheduler 1225 makes the simplifying assumption that each of the three sectors should transmit data with the same power Q. Then the SNR seen by the WT 929 for a transmission from sector S0 923 is given by $$SNR_{S0}(Q, Q, Q) = \frac{\alpha Q}{\beta Q + \gamma Q + N}$$

$$= \frac{SNR0(P)}{SRR2 \cdot SNR0(P) + \frac{P}{Q}}$$

In this case, it is sufficient to report SNR0(P) and SRR2.

Next, for the situation shown in FIG. 9 with respect to cell 941, the WT 949 is located near the sector boundary with sector S2 947. Since the WT 949 receives significant interference from sector S2 947, a coordinated scheduler 1225 for the base station 1200 can turn off the corresponding data transmissions in sector S2 947. Meanwhile, suppose the transmission for sector S1 945 is scheduled with the same transmit power Q as in sector S0 943. Then the SNR seen by the WT 949 will be given by $$SNR_{S0}(Q, Q, 0) = \frac{\alpha Q}{\beta Q + N}$$

$$= \frac{SNR0(P)}{SRR1^\beta \cdot SNR0(P) + \frac{P}{Q}}$$

in which case it is sufficient to report SNR0(P) and SRR1$^\beta$.

Hence, if the BS 1200 restricts the transmit powers such that they are equal to some value Q or are equal to 0, then in each of the three possible configurations, only a subset of information needs to be transmitted from the WT 1300 to the BS 1200. In particular, in one embodiment, the wireless terminal 1300 makes a decision as to which of the situations (e.g., as shown in FIG. 9 cell 901, FIG. 9 cell 921 and FIG. 9 cell 941) the WT 1300 is currently in. This information can be transmitted by the WT 1300 to the BS 1200 as a two-bit Sector Boundary Indicator. The sector boundary indicator indicates wireless terminal position information relative to a sector boundary. The first bit could indicate whether the WT 1300 is on a boundary so that it is necessary to turn off the transmission in the neighboring sector. The second bit could indicate which of the two sectors causes more interference. Possible 2 bit sector boundary indicators are listed in the first column of Table 1 set forth below. The second column of Table 1 indicates noise contribution information. The third column lists the control action to be taken by the BS 1200 in response to receiving the corresponding sector boundary indicator. The fourth column lists the two channel quality indictor values reported given the corresponding reported sector boundary indictor listed in the same row.

TABLE 1

| Sector Boundary Indicator | SNR | Other sectors | WT reports |
|---|---|---|---|
| 00 | $SNR_{S0}$ (Q, Q, Q) | Transmit on all sectors | SNR0(P), SRR2 |
| 10 | $SNR_{S0}$ (Q, 0, Q) | Turn off sector S2 | SNR0(P), $SRR1^{\gamma}$ |
| 11 | $SNR_{S0}$ (Q, Q, 0) | Turn off sector S1 | SNR0(P), $SRR1^{\beta}$ |

In this way, since the WT 1300 identifies to the base station 1200 which configuration it prefers, the WT 1300 needs to only report SNR0(P) and one of the three SRRs.

A multi-sector cell with an arbitrary number of sectors will now be discussed. In another embodiment of this invention, for the situation where there are an arbitrary number of sectors, the sectors are divided into three sector types, which we will label S0, S1 and S2. This classification into sector types is done in such a way that two adjacent sectors will not have the same type. It is assumed that for two non-adjacent sectors, the effect of interference is considered small enough as to not be significant, so that the main cause of interference is from adjacent sectors of different types. Hence it is possible to treat this situation in an analogous fashion to the case of the 3-sector cell, since the primary source of interference in each sector comes from its two neighboring sectors.

Figure 10:
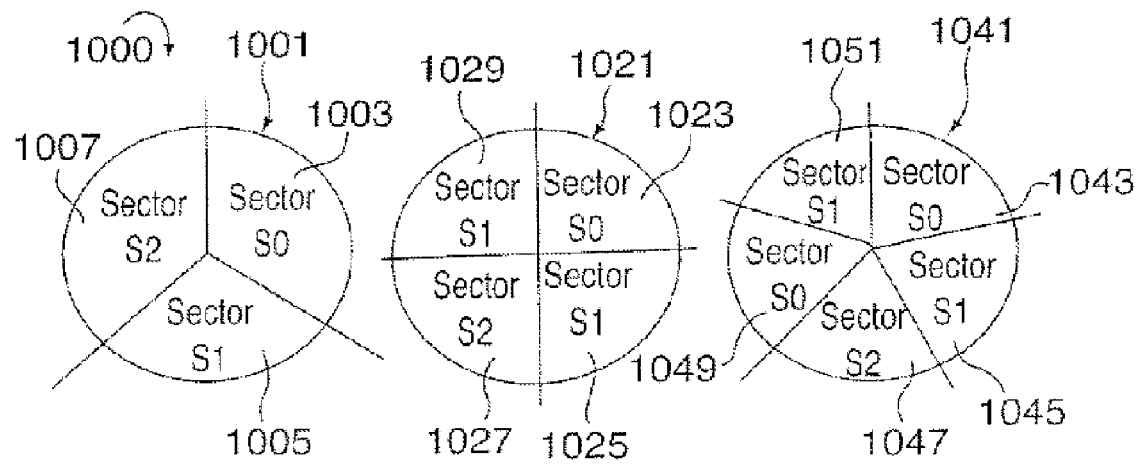
FIG. 10 illustrates a scheme using 3 sector types, which are repeated for the cases with cells involving more than 3 sectors in accordance with the present invention.

FIG. 10 includes a diagram 1000 that shows the sector types for exemplary cells 1001, 1021, and 1041 with 3, 4 and 5 sectors, respectively. Cell 1001 includes a first sector S0 type sector 1003, a first sector S1 type sector 1005, and a first sector S2 type sector 1007. Cell 1021 includes a first sector S0 type sector 1023, a first sector S1 type sector 1025, a first sector S2 type sector 1027, and a second S1 type sector 1029. Cell 1041 includes a first sector S0 type sector 1043, a first sector S1 type sector 1045, a first sector S2 type sector 1047, a second S0 type sector 1049, and a second S1 type sector 1051. Table 2 set forth below gives an example of a plan for different numbers of sectors, where the order of the list of sector types corresponds to the order proceeding (e.g., clockwise) around the sector.

TABLE 2

| Number of sectors | Sector types |
|---|---|
| 1 | S0 |
| 2 | S0, S1 |
| 3 | S0, S1, S2 |
| 4 | S0, S1, S2, S1 |
| 5 | S0, S1, S2, S0, S1 |
| 6 | S0, S1, S2, S0, S1, S2 |
| 7 | S0, S1, S2, S0, S1, S2, S1 |
| 8 | S0, S1, S2, S0, S1, S2, S0, S1 |
| 9 | S0, S1, S2, S0, S1, S2, S0, S1, S2 |

Using the above sector type scheme, the scheme involving cell null pilots and sector null pilots for the case of three sectors can be used for an arbitrary number of sectors.

While described in the context of an OFDM system, the methods and apparatus of the present invention are applicable to a wide range of communications systems including many non-OFDM. In addition, some features are applicable to non-cellular systems.

In various embodiments nodes described herein are implemented using one or more modules to perform the steps corresponding to one or more methods of the present invention, for example, signal processing, message generation and/or transmission steps. Thus, in some embodiments various features of the present invention are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, the present invention is directed to a machine-readable medium including machine executable instructions for causing a machine, e.g., processor and associated hardware, to perform one or more of the steps of the above-described method(s).

Numerous additional variations on the methods and apparatus of the present invention described above will be apparent to those skilled in the art in view of the above description of the invention. Such variations are to be considered within the scope of the invention. The methods and apparatus of the present invention may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of the present invention.

Figure 14:
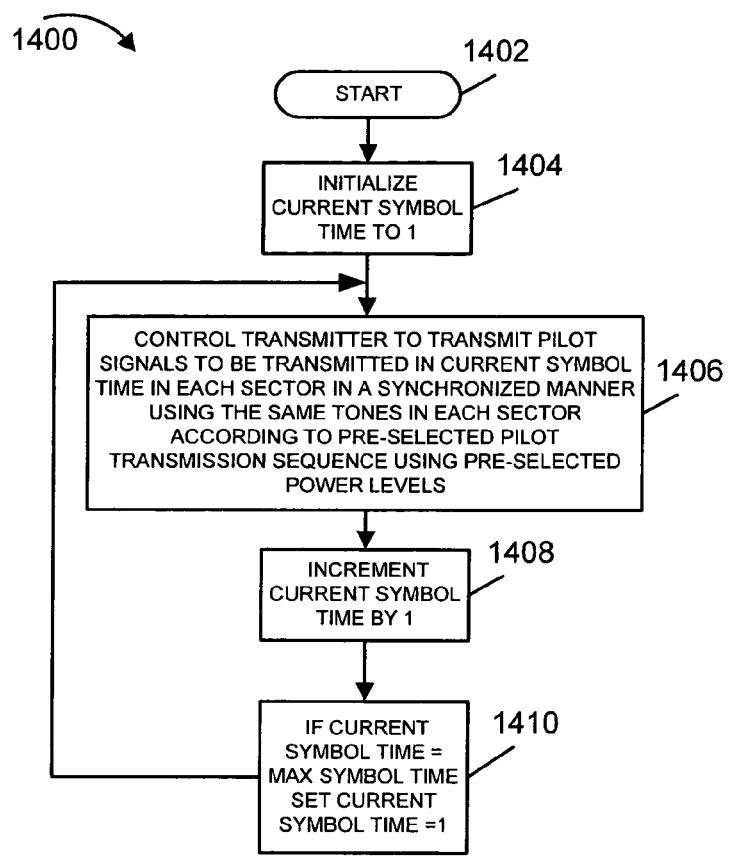
FIG. 14 illustrates the steps of transmitting pilot tones in multiple sectors of a cell in a synchronized manner in accordance with the present invention.

FIG. 14 illustrates the steps of an exemplary method 1400 of transmitting pilot tones in multiple sectors of a cell in a synchronized manner in accordance with the present invention. The method starts in start node 1402 and proceeds to step 1404 wherein a current symbol time counter is initialized, e.g., to 1. Symbols are transmitted in the exemplary system on a per symbol basis with a symbol time being the time used to transmit one symbol along with a cyclic prefix which is normally a copy of a portion of the transmitted symbol that is added for redundancy to protect against multipath interference and minor symbol transmission timing errors.

Operation proceeds from step 1404 to step 1406 wherein the transmitter is controlled to transmit pilot symbols to be transmitted in the current symbol time in each sector in a synchronized manner using the same tones in each sector according to a pre-selected pilot transmission sequence, e.g., pilot tone hopping sequence, using pre-selected transmission power levels in each sector of the cell. While pilots are transmitted in each sector of a cell in parallel, the power level transmitted on a tone may be some pre-selected level or zero in the case of a null tone. While the transmission times of pilot signals in each sector are generally synchronized, slight timing offsets between sectors may occur. Thus, each sector may actually use a different symbol transmission time period. However, the symbol times in each sector are sufficiently synchronized that there is substantial overlap in the symbol times used to transmit symbols in each sector. Normally the substantial overlap is such that the symbol transmission start times are synchronized to be within at least a period of time corresponding to the time used to transmit the cyclic prefix sometimes called the cyclic prefix duration. Thus, there is normally substantial overlap in the symbol times of the different sectors even if there is not perfect overlap in symbol times.

Which tones are used for pilot tones during a particular symbol time is determined from the tone information 1238 included pilot hopping sequence tone information 1234 while the power to be used on a given tone in each sector of the cell is determined from power level information 1236.

Once the pilot tones are transmitted for the current symbol time in step 1406 operation proceeds to step 1408 wherein a current symbol time count is incremented by 1. Then in step 1410 a check is made to see if the current symbol time has reached a maximum symbol time. If the current symbol time is equal to the maximum the current symbol time is reset to 1 so that the pilot hopping sequence can begin to repeat in step 1406. The periodic transmission of pilot tones continues to repeat according to the implemented pilot tone hopping sequence until base station transmission stop or some other event causes the pilot signal transmission process to be interrupted.

Referring now to FIGS. 15-17 various exemplary pilot tone transmissions are shown along with pilot signal transmission power information.

In accordance with the present invention, pilot tones are transmitted using the same tones in multiple sectors of a cell at the same or substantially the same time. In various embodiments of the present invention the symbol transmission times are synchronized in the various sectors of the cell. Assuming perfect synchronization, there would be full overlap in terms of time between the pilot tones transmitted in the various sectors of a cell at any given time. Unfortunately, as noted above, precise synchronization may not be possible for a variety of reasons related to the complexity of synchronizing transmissions between different amplifiers and antennas operating at high frequencies. However, in synchronized sector implementations a substantial amount of overlap of symbol times exists between the sectors. Thus pilot transmissions can be achieved with substantial overlap making signal measurements which assume full overlap during at least a portion of each sectors symbol transmission time possible. As mentioned above, in the synchronized embodiment of the invention the difference between symbol transmission start times between the various sectors of a cell usually is less than the duration of the cyclic prefix which is normally included with transmitted symbols.

For purposes of discussion, it will be assumed that there is full synchronization with signals, e.g., symbols, being transmitted at the same time in a synchronized manner in each sector of a multi-sector cell. However, the above discussion makes it clear that such precise synchronization normally does not occur and is not required to practice the invention. Thus, the transmission in each sector corresponds to a different symbol time which may be slightly offset from the symbol time of the adjacent sector. In accordance with the present invention, while pilot tones are transmitted in each sector of a cell on the same set of tones in a synchronized manner, the power of the pilot tones in different sectors of a cell are controlled to permit different signal measurements which facilitate, in a particular sector, determining the noise contribution from other, e.g., adjacent sector(s) as well as background noise.

To facilitate multiple different signal measurements, multiple pilot tones may be used during a single symbol transmission time. Alternatively, one pilot signal may be used per symbol time with the pilot signal being assigned different power levels during different, e.g., successive, symbol times. In such a case, the pilot signal measurements made during different symbol times may be used to produce the two different channel quality indicator values which are returned to the base station in accordance with the invention.

FIG. 15 is a chart 1500 showing a two-sector pilot tone transmission sequence implemented in one exemplary embodiment of the present invention. As will be discussed below, the sequence shown in FIG. 15 can be extend to systems with N sectors, where N is an arbitrary number greater than 1. The sequence shown in FIG. 15 is implemented for a cell which includes two sectors, sector A and sector B. The symbol times in each sector may be slightly offset but substantially overlap and therefore will be described as the same symbol time although actually being two slightly different symbol times in many cases. The first column 1502 titled time refers to the symbol time in which a tone is transmitted assuming perfect synchronization between sectors. In one embodiment, where the same tone is used in each symbol time for pilot signal purposes, each symbol time 1 through 4, corresponds to a different current symbol time. The second column 1504 titled TONE lists the tone, e.g., frequency, on which the pilot signals are transmitted. Each row corresponds to one tone. Different rows may correspond to the same or different tones depending on the particular implementation. For example, in cases where the first through fourth symbol times are the same current symbol time, then the first through fourth tones listed in column 1504 will be different since each pilot signal requires one tone. However, in cases where the first through $4^{th}$ symbol times in column 1502 correspond to different current symbol times, the tones listed in column 1504 may be the same or different.

As discussed above each row 1512, 1514, 1516 and 1518 corresponds to the transmission of a tone in each of the cells sectors A and B. e.g., a tone used to transmit a pilot signal. The transmission power levels in each of the sectors may be different or the same. In each case, the pilot tone transmitted at any point in time is transmitted with a pre-selected transmission power. Thus, the transmission power and tone on which a pilot signal is transmitted will be known to both the base station 1200 and wireless terminals 1300 since this information is stored in both devices and both devices know the current symbol time from timing information available in the cell. In FIG. 15, the third column 1506 lists the pilot signal transmission power level for the pilot signal transmitted in sector A using the tone to which the particular row corresponds. Similarly the fourth column 1508 lists the pilot signal transmission power level for the pilot signal transmitted in sector B using the tone to which the particular row corresponds. Column 1510 is included for purposes of explaining a 3 sector embodiment later but is not used in the two sector implementation being described in regard to FIG. 15.

Each rectangle in column 1506 and 1508 represents a step of transmitting a pilot signal in the indicated sector at the general symbol time indicated in column 1502 using the tone indicated in column 1504. In practice, the tones are transmitted at slightly different symbol times in each of sectors A and B. e.g., first and second symbol times which correspond substantially to the symbol time listed in column 1502. A 1 is used to indicate a non-zero pilot having a first pre-selected transmission power while a zero is used to indicate transmission of a null tone, e.g., a pilot signal with transmitted with zero power.

Row 1512 shows that at symbol time 1, using tone 1, a 1 pilot signal is transmitted in sector A while a NULL pilot signal is transmitted in sector B. This makes it possible to measure the contribution of inter-sector interference in sector B caused by sector A transmission on the same tone. It also allows sector A to make accurate measurements of the attenuation in sector A without the presence of interference due to sector B transmission. Row 1514 corresponds to symbol time 2 wherein tone 2 is used to transmit a NULL tone in sector A and a 1 pilot signal in sector B. This allows sector A to determine the amount of signal interference due to sector B transmission on the same tone. Row 1516 corresponds to symbol time 3 wherein tone 3 is used to transmit a NULL pilot signal in both sectors A and B making general background noise measurements possible on tone 3. Row 1518 corresponds to symbol time 4 wherein tone 4 is used in both sectors A and B to transmit 1 pilot signals. In such a case each sector can measure the effect of having a signal transmitted with the same non-zero power level in each of sectors A and B at the same time. Normally pilot signals are transmitted in accordance with both the first and second rows 1512, 1514 of FIG. 15 and at least one of rows 1516 and 1518 in order to provide a wireless terminal to make sufficient signal measurements which required as input to the two different functions used to generate the first and second channel quality indicator values that are feedback to the base station 1200 in accordance with one feature of the invention.

FIG. 16 is a chart 1600 illustrating an exemplary pilot tone transmission sequence for a three sector system. As in the FIG. 15 example, the first column 1602 corresponds to symbol transmission time, the second column 1604 corresponds to tone while columns 1606, 1608 and 1610 indicate pilot signal transmissions in each of three sectors A, B and C of a cell, respectively. Thus, as in the FIG. 15 example, each rectangle of column 1606, 1608 and 1610 which corresponds to one of the first through fifth rows, 1612, 1614, 1616, 1618, 1620 represents the step of transmitting a pilot signal on the indicated tone in the indicated sector. While the tones used in each row are the same in each sector, as discussed above, when each of the symbol times corresponds to the same current symbol time, the each of the first through fifth tones will be different. However, when each of the first through fifth symbol times are different the first through fifth tones may be the same or different.

Note that in the FIG. 16 implementation, at least one pilot signal is transmitted for each sector with a null pilot being transmitted on the same tone in an adjoining sector. Also note the use in row 1620 of what has been described as cell null which facilitates background noise measurements.

FIG. 17 is a chart 1700 showing a three sector implementation similar to FIG. 16 with the pilots transmitted in each sector being described in a more general manner in terms of power levels. The transmission of 15 pilots P1 through P15 are shown in the FIG. 17 embodiment with each pilot being transmitted at a different symbol time in the case where each row corresponds to a different transmission symbol period. In the case where each of the listed signals are to be transmitted in the same symbol time, three different symbol times are shown, with the transmission time of each sector being slightly different but corresponding to substantially the same symbol time as used in the other sectors.

As in the FIGS. 15 and 16 examples the pilots of each row 1712, 1714, 1716, 1718, 1720 are transmitted using the same tone but different rows may correspond to different tones. While being shown as being transmitted at 5 different symbol times as listed in the first column 1702, when variations in sector transmission times is taken into consideration each rectangle listed on the heading Sector may actually correspond to a different symbol time with the symbol times of each row substantially overlapping and being identical in the case of precise synchronization. The power level of each of the first through 15$^{th}$ pilots P1 through P15 are represented in parenthesis, e.g., the transmission power for P1 is p1. While in some cases such as in the FIG. 16 example two different power levels are supported, multiple known power levels may be supported. The last row 1720 of FIG. 17 represents the transmission of a NULL pilot signal using tone 5 in each of sectors A, B and C according the power level of these pilot signals is 0 in each case.

Figure 19:
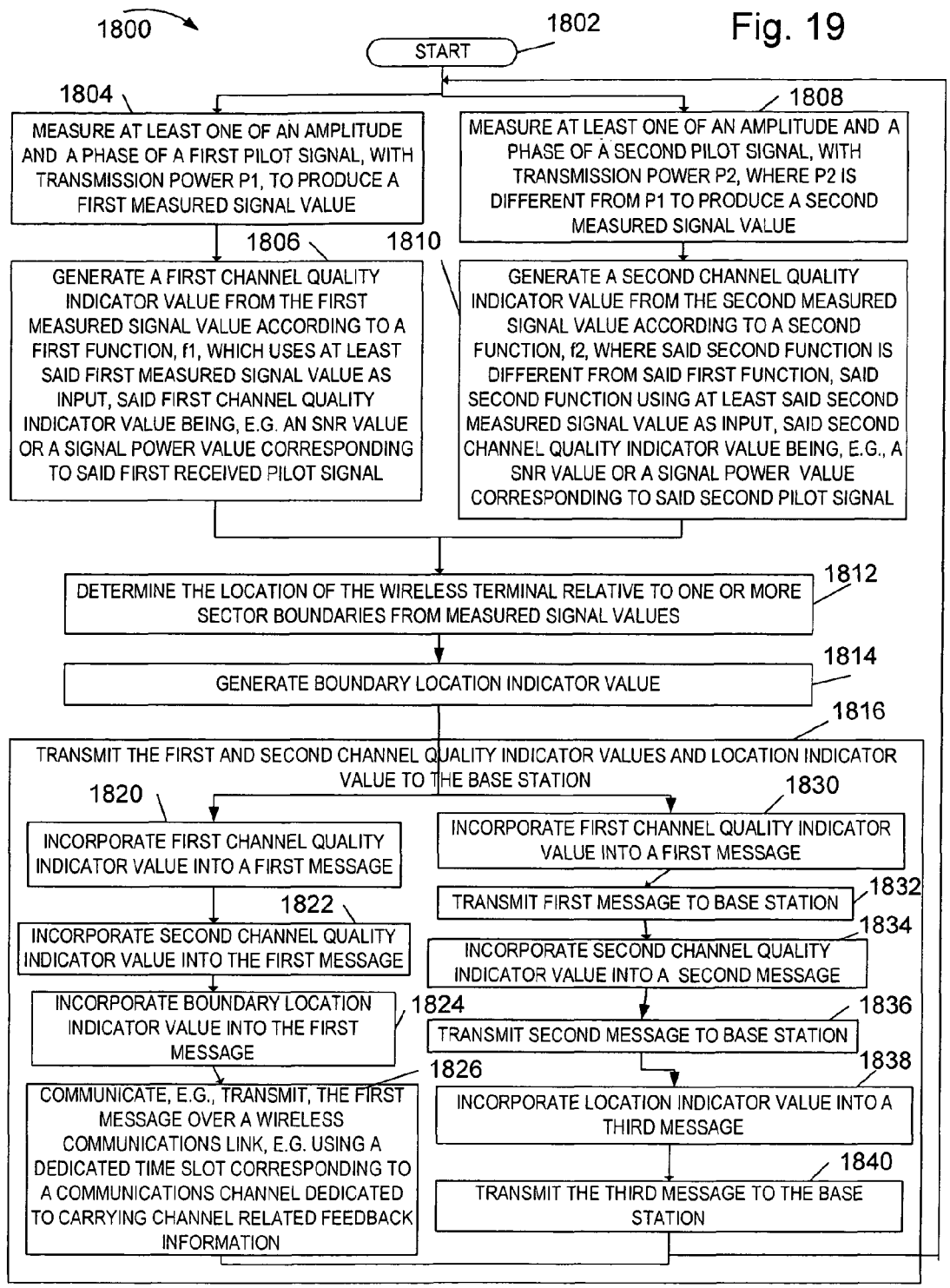
FIG. 19 is a flowchart illustrating the operation of an exemplary wireless terminal implementing the methods of the present invention.

FIG. 18 illustrates a chart 1750 showing the transmission of signals on 10 different tones during a single symbol transmission time period. In the FIG. 17 implementation the 0 is used to represent a NULL pilot signal, while a 1 is used to represent a pilot at a single known non-zero transmission power level which is normally higher than the power level at which data is transmitted. D is used in the chart 1750 to illustrate the transmission of data in one of the sectors A, B and C. The data signal D is usually transmitted on the tone at a power level lower than the pilot signal level 1 and therefore may not cause significant interference with the pilot in the neighboring sector. Data is normally transmitted in each of the sectors on additional tones not shown in FIG. 17 during the illustrated symbol time. In the OFDM embodiment of the present invention, in a given sector such additional data tones do not interfere with the pilot tones since they are orthogonal to the tones used to transmit pilot signals. FIG. 19 illustrates a method 1800 of operating a wireless terminal to process pilots signals received from a base station 1200, which were transmitted in accordance with the present invention. The received pilot signals may be pilot signals that were transmitted with known different transmission power levels allowing the receiving device to make various signal measurements and computations useful for determining various noise contributions, e.g., background noise as well as inter-sector interference.

The method 1800 starts in start node 1802 and proceeds along two processing paths beginning with steps 1804 and 1808, respectively. The two processing paths may be implemented in parallel, e.g., in the case where multiple pilot signals with different transmission power levels are transmitted during a single symbol time, or in series, e.g., in the case where pilots are transmitted sequentially using the same tone but different power levels during different symbol transmission times.

In step 1804, the wireless terminal 1300 measures at least one of an amplitude and a phase of a first pilot signal that was transmitted with transmission power P1 to produce a first measured signal value. The first measured signal value is then used in step 1806. In step 1806, a first channel quality indicator value is generated from the first measured signal value according to a first function, f1, which uses at least said first measured signal value as an input. The first channel quality indicator value generated by function f1 may be, for example, an SNR value or a signal power value, corresponding to said first received pilot signal. Function f1 may use other signal measurements and/or other information as inputs in addition to the first measured signal value when generating the first channel quality indicator value. Operation proceeds from step 1806 to step 1812.

In step 1808, which may be performed in parallel with step 1804 in some embodiments, the wireless terminal 1300 measures at least one of an amplitude and a phase of a second pilot signal which was transmitted with transmission power P2, where P2 is different from P1. The measurement produces a second measured signal value which is then used in step 1810. In step 1810 a second channel quality indicator value is generated from the second measured signal value according to a second function, f2, which uses the second measured signal value as an input. The second function is different from said first function and uses at least the second measured signal value as an input but may also use other signal measurements as inputs as well. In some embodiments, the second channel quality indicator value generated by the second function is an SNR value corresponding to the second pilot signal while in other embodiments it is a signal power value, e.g., an indicator of received signal power, corresponding to the second pilot signal. Operation proceeds from step 1810 to step 1812.

In step 1812, the wireless terminal 1300 determines the location of the wireless terminal relative to one or more sector boundaries from measured signal values and/or other boundary location indicator value information discussed above. Using the relative boundary location and/or other information generated in step 1812, in step 1814 the wireless terminal 1300 generates a boundary location indicator value 1814, e.g., having a value corresponding to one of the values shown in column 1 of Table 2. With the first and second channel quality values from steps 1806 and 1810, and the boundary location indicator value from step 1814, operation proceeds to transmit step 1816 wherein the generated information is transmitted back to the base station 1200.

Step 1816 involves the transmission of the first and second channel quality indicator values and the boundary location indicator value, e.g., as part of one or more messages. Two alternative processing paths are shown with a single processing path being used in any particular implementation. The first processing path beginning with sub-step 1820 and ending with 1826 represents the case where various information is included in a single message. The second processing path beginning with step 1830 and ending with step 1840 corresponds to the case where different messages are used to transmit each of the various values. Messages in this context are to be interpreted broadly and include signals which convey the particular values to be communicated.

In step 1820, the first channel quality indicator value is incorporated into a first message. Then, in step 1822 the second channel quality indicator value is incorporated into the first message. Next, in step 1824 the boundary location indicator value is incorporated into the first message. The first message is then communicated to the base station 1200 in step 1826, e.g., by transmitting the first message over a wireless communication link. This is done in various embodiments using one or more dedicated time slots of a control channel used to report channel quality and/or other feedback information from wireless terminals to the base station 1200. As a result of the dedication of the time slot to the wireless terminal using it to report channel quality and other information, other wireless terminals or devices in the sector will not use the time slot. Thus, through the use of dedicated time slots transmission conflicts are avoided. Furthermore, given that the channel is dedicated to communicating particular control information, the values may be generated and transmitted in the time slots without having to send headers or other information indicating what the meaning of the transmitted values are. That is, the base station 1200 knows that values transmitted in the utilized control channel are to have a certain pre-selected format and represent, e.g., first and second channel quality indicator values followed by a two bit boundary location indicator value. Thus, the amount of overhead, e.g., header overhead, used to transmit such messages and/or values can be minimized. With the transmission of the generated values having been completed in step 1826, operation returns to steps 1804 and 1808 wherein signal measurements are made on new pilot signals with the feedback process continuing to repeat over time.

In step 1830, which corresponds to the alternate value transmission path shown in step 1816, the first channel quality indicator value is incorporated into a first message, e.g., a signal, which is then transmitted to the base station in step 1832. Then, in step 1834 the second channel quality indicator value is incorporated into a second message, e.g., signal, which is transmitted in step 1836. The boundary location indicator value is incorporated in step 1838 into a third message, which is then transmitted to the base station 1200 in step 1840. As in the case of the combined message transmitted in step 8126, the individual messages transmitted in steps 1832, 1836 and 1840 may be transmitted using dedicated segments of a control channel dedicated to the communication of feedback information. Operation proceeds from step 1840 to steps 1804 and 1808 with the processing of generating the channel feedback information and reporting the information to the base station 1200 repeating over time.

FIG. 20 shows a flowchart 1900 illustrating a method of operating base station (BS) 1200 in accordance with the present invention, e.g., to transmit pilot tones and to receive and process feedback information to determine the power level at which to transmit data signals. The method starts with step 1902 where the base station 1200 is powered on and operational. In step 1904, base station's transmitter 1204, coupled to a multi-sector antenna 1205, transmits pilot signals into each sector, e.g. S0 1106, S1 1108, S2 1110 of a multi-sector cell, e.g., 1104 at the same time in a synchronized manner using predetermined power levels and tones such that the transmission of the pilot tones into each of the sectors 1106, 1108, 1110 of the cell 1104 use the same set of tones and are transmitted at substantially the same time in each of the sectors 1106, 1108, 1110. The transmission of pilot tones in step 1904 is performed under the direction of the pilot signal generation and transmission control routine 1230 using pilot tone power level info 1236 and tone info 1238. Operation proceeds to step 1906 where BS 1200 receives messages from at least one wireless terminal (WT) 1300 including, e.g., a set of channel quality indicator values, e.g., first and second channel quality indicator values, and sector boundary position information. The messages are received under the direction of the received signal processing routine 1260 included in base station 1200. In step 1908, the base station, under the direction of channel quality indicator value extraction module 1262 extracts at least two different channel quality indicator values 1250, e.g., from a single message or from multiple messages received from a wireless terminal 1300. In some embodiments each channel quality indicator value is in a separate message. In other embodiments multiple channel quality indicator values are include in a single message from a WT 1300. Next, in step 1910, the base station 1200, under control of position information extraction module 1264, extracts location information from received messages, e.g., boundary position indicator value, indicating the position of a wireless terminal 1300 relative to a boundary in a multi-sector cell. This location information may have been transmitted by WT 1300 in a separate message or may have been included in a message including channel quality indicator values. This location information may identify whether the WT 1300 is near a sector boundary, and identify which sector boundary, e.g., identify the adjacent sector from which a higher level of transmission power dependent interference is being received. Sector boundary information extracted from received messages is stored in sector boundary position information 1252 in BS 1200.

Proceeding to step 1912, the base station 1200, under the direction of transmission power calculation routine 1226 calculates from at least first and second channel quality indicator values 1250 an amount of transmission power required to achieve a desired signal to noise ratio at said wireless terminal 1300 from which said first and second channel quality indicator values 1250 were received. In step 1914, the base station scheduler module 1225 operates to make scheduling decisions for the wireless terminals 1300. In sub-step 1916, the base station scheduler 1225 makes decisions for the WT 1300 based on determined SNR, e.g., BS 1200 schedules segments to the WT 1300 on channels with transmission power levels that will result in a received SNR of the WT 1300 exceeding the minimum acceptable level for the data rate and coding scheme used. In sub-step 1918, the BS 1200 scheduler 1225 makes decisions for the WT 1300 based on sector boundary position information 1252, e.g., for a WT 1300 identified as being near a sector boundary, base station 1200 assigns channel segments to the WT 1300, with corresponding channel segments in the adjacent sector having no transmission power. Proceeding to step 1920, BS 1200 transmitter 1205 transmits signal, which may include, e.g., user data 1244 that has been encoded by encoder 1214, under direction of signaling routine 1228 at a scheduled time to said WT 1300 using transmission power determined from said at least two channel quality indicator values 1250 that were received.

Operation proceeds from step 1920 back to step 1904 and the method is repeated. Base station 1200 will be repeating the transmitting pilot signals in a synchronized manner into each sector of the multi-sector cell in step 1904, on a regular basis. However, different wireless terminals 1300, may send messages including set of channel quality indicator values 1250 and sector boundary position information 1252 at different times and/or different rates depending on factors such as the state of operation the wireless terminal is in, e.g., on, hold, sleep.

The invention is directed to, among other things, machine readable medium such as memory, compact disks, etc. including machine executable instructions, e.g., software modules or commands, for controlling a processor or other device to perform processing in accordance with one or more of the various method steps of the invention. Various features of the methods and apparatus of the invention can be used in a wide range of communications systems including, but not being limited to, OFDM, CDMA and other types of communications systems.

What is claimed is:

1. A method to operate on an apparatus for transmitting pilot tones in a multi-sector cell including at least a first sector and a second sector, the second sector being located adjacent to said first sector, the method comprising:
    transmitting, using a first tone, in said first sector during a first symbol time a first pilot signal having a first transmission power;
    transmitting, using a second tone, in the first sector during the first symbol time a second pilot signal having a second transmission power which is different from the first transmission power;
    transmitting, using the second tone, in the second sector during the first symbol time a third pilot signal having a third transmission power; and
    transmitting, using the first tone, in the second sector during the first symbol time a fourth pilot signal having a fourth transmission power which is different from the third transmission power.

2. The method of claim 1, wherein the second transmission power is zero, the second pilot signal being a NULL pilot signal.

3. The method of claim 1, wherein the second transmission power and the fourth transmission power are the same.

4. The method of claim 3, wherein said second transmission power is zero, the second and fourth pilot signals being NULL pilot signals.

5. The method of claim 3, wherein the first transmission power and the third transmission power are the same.

6. The method of claim 1, further comprising receiving a first channel quality indicator (CQI) value related to the first pilot signal and a second CQI value related to the second pilot signal from at least one device.

7. The method of claim 6, further comprising determining a transmission power for a subsequent signal in the first sector based at least in part on the first CQI value and the second CQI value.

8. An apparatus for transmitting pilot tones in a multi-sector cell including at least a first sector and a second sector, the second sector being located adjacent to the first sector, comprising:
    at least one processor; and
    memory coupled to the at least one processor, wherein the memory includes instructions that are executable by the at least one processor to:
        transmit a first pilot signal at a first transmission power using a first tone in the first sector during a first symbol time;
        transmit a second pilot signal at a second transmission power using a second tone in the first sector during the first symbol time, where the second transmission power is different from the first transmission power;
        transmit a third pilot signal at a third transmission power using the second tone in the second sector during the first symbol time;
        transmit using the first tone, in the second sector during the first symbol time a fourth pilot signal having a fourth transmission power which is different from the third transmission power.

9. The method of claim 8, wherein the second transmission power is zero, the second pilot signal being a NULL pilot signal.

10. The apparatus of claim 8, wherein the second transmission power and the fourth transmission power are the same.

11. The apparatus of claim 10, wherein the second transmission power is zero, the second and fourth pilot signals being NULL pilot signals.

12. The apparatus of claim 10, wherein the transmission power and the third transmission power are the same.

13. The apparatus of claim 8, wherein the instructions are executable by the at least one processor to receive a first channel quality indicator (CQI) value related to the first pilot signal and a second CQI value related to the second pilot signal from at least one device.

14. The apparatus of claim 13, wherein the instructions are executable by the at least one processor to determine a transmission power for a subsequent signal in the first sector based at least in part on the first CQI value and the second CQI value.

15. An apparatus for transmitting pilot tones in a multi-sector cell including at least a first sector and a second sector, the second sector being located adjacent to the first sector, comprising:
    means for determining a first transmission power for transmitting a first pilot signal, a second transmission power for transmitting a second pilot signal, and a third transmission power for transmitting a third pilot signal, wherein the first transmission power is different from the second transmission power;

means for transmitting the first pilot signal at the first transmission power in the first sector using a first tone during a first symbol time;

means for transmitting the second pilot at the second transmission power in the first sector using a second tone during the first symbol time;

means for transmitting the third pilot signal at the third transmission power in the second sector using the second tone during the first symbol time; and means for transmitting, using the first tone, in the second sector during the first symbol time a fourth pilot signal having a fourth transmission power which is different from the third transmission power.

16. The apparatus of claim 15, wherein the second transmission power is zero, the second pilot signal being a NULL pilot signal.

17. The apparatus of claim 15, further comprising means for receiving a first channel quality indicator (CQI) value related to the first pilot signal and a second CQI value related to the second pilot signal from at least one device.

18. The apparatus of claim 17, further comprising means for determining a transmission power for a subsequent signal in the first sector based at least in part on the first CQI value and the second CQI value.

19. A non-transitory computer-readable medium comprising code for:

transmitting, using a first tone, in the first sector during a first symbol time a first pilot signal having a first transmission power;

transmitting, using a second tone, in the first sector during the first symbol time a second pilot signal having a second transmission power which is different from the first transmission power;

transmitting, using the second tone, in the second sector during the first symbol time a third pilot signal having a third transmission power; and transmitting, using the first tone, in the second sector during the first symbol time a fourth pilot signal having a fourth transmission power which is different from the third transmission power.

20. The non-transitory computer-readable medium of claim 19, wherein the second transmission power is zero, the second pilot signal being a NULL pilot signal.

21. The non-transitory computer-readable medium of claim 19, wherein the second transmission power and the fourth transmission power are the same.

22. The non-transitory computer-readable medium of claim 21, wherein the second transmission power is zero, the second and fourth pilot signals being NULL pilot signals.

23. The non-transitory computer-readable medium of claim 21, wherein the first transmission power and the third transmission power are the same.

24. The non-transitory computer-readable medium of claim 19, the non-transitory computer-readable medium further comprising code for receiving a first channel quality indicator (CQI) value related to the first pilot signal and a second CQI value related to the second pilot signal from at least one device.

25. The non-transitory computer-readable medium of claim 24, the non-transitory computer-readable medium further comprising code for determining a transmission power for a subsequent signal in the first sector based at least in part on the first CQI value and the second CQI value.

* * * * *